US00RE50038E

(19) United States
(12) Reissued Patent
Kim et al.

(10) Patent Number: US RE50,038 E
(45) Date of Reissued Patent: Jul. 9, 2024

(54) METHOD AND DEVICE FOR CONFIGURING TRANSMISSION OPPORTUNITY PERIOD IN WIRELESS ACCESS SYSTEM SUPPORTING UNLICENSED BAND

(71) Applicant: LG Electronics Inc., Seoul (KR)

(72) Inventors: Seonwook Kim, Seoul (KR); Suckchel Yang, Seoul (KR); Kijun Kim, Seoul (KR); Joonkui Ahn, Seoul (KR); Hanbyul Seo, Seoul (KR); Seungmin Lee, Seoul (KR)

(73) Assignee: LG ELECTRONICS INC., Seoul (KR)

(21) Appl. No.: 17/832,561

(22) Filed: Jun. 3, 2022

Related U.S. Patent Documents

Reissue of:
(64) Patent No.: 11,096,166
Issued: Aug. 17, 2021
Appl. No.: 16/205,425
Filed: Nov. 30, 2018

U.S. Applications:
(63) Continuation of application No. 15/328,837, filed as application No. PCT/KR2015/008052 on Jul. 31, 2015, now Pat. No. 10,178,667.
(Continued)

(51) Int. Cl.
*H04W 4/00* (2018.01)
*H04W 16/14* (2009.01)
(Continued)

(52) U.S. Cl.
CPC ..... *H04W 74/0816* (2013.01); *H04W 16/14* (2013.01); *H04W 28/26* (2013.01);
(Continued)

(58) Field of Classification Search
CPC . H04W 74/0816; H04W 74/08; H04W 16/14; H04W 28/26; H04W 72/0446; H04W 74/0808; H04L 5/0048
See application file for complete search history.

(56) References Cited

U.S. PATENT DOCUMENTS 11,064,364 B2 * 7/2021 Noh ..... H04W 74/0833
2012/0120998 A1 * 5/2012 Fakhrai ..... H04L 1/0015 375/224
(Continued)

FOREIGN PATENT DOCUMENTS

CN 103299563 A 9/2013
CN 103765824 A 4/2014
(Continued)

OTHER PUBLICATIONS

R1-121712: 3GPP TSG RAN WG1 #68bis Jeju, Korea, Mar. 26-30, 2012, CMCC, "Discussion on additional special subframe configuration," pp. 1-6.
(Continued)

*Primary Examiner* — Luke S Wassum
(74) *Attorney, Agent, or Firm* — BRYAN CAVE LEIGHTON PAISNER LLP

(57) ABSTRACT

The present disclosure relates to a wireless access system supporting an unlicensed band, and provides a method for configuring a transmission opportunity period (TxOP) and devices for supporting the same. The method for configuring a TxOP in a wireless access system supporting an unlicensed band, according to one embodiment of the present disclosure, can comprise the steps of: performing a carrier sensing step for checking whether a secondary cell (SCell) constituted in an unlicensed band is in an idle state; transmitting a reservation signal for a predetermined amount of time if the SCell is in the idle state; and configuring a TxOP in the SCell. At this time, a start point of a first subframe (SF) included in the TxOP can be matched to a subframe, a slot or symbol boundary of a primary cell (PCell) constituted in a licensed band.

13 Claims, 24 Drawing Sheets

Related U.S. Application Data

(60) Provisional application No. 62/166,122, filed on May 25, 2015, provisional application No. 62/142,448, filed on Apr. 2, 2015, provisional application No. 62/132,511, filed on Mar. 13, 2015, provisional application No. 62/105,754, filed on Jan. 21, 2015, provisional application No. 62/081,562, filed on Nov. 18, 2014, provisional application No. 62/031,817, filed on Jul. 31, 2014.

(51) Int. Cl.

| | |
|---|---|
| ***H04W 28/26*** | (2009.01) |
| ***H04W 72/04*** | (2023.01) |
| ***H04W 72/0446*** | (2023.01) |
| ***H04W 74/08*** | (2024.01) |
| ***H04W 74/0808*** | (2024.01) |
| ***H04W 74/0816*** | (2024.01) |
| *H04L 5/00* | (2006.01) |

(52) U.S. Cl.

CPC ..... *H04W 72/0446* (2013.01); *H04W 74/08* (2013.01); *H04W 74/0808* (2013.01); *H04L 5/0048* (2013.01)

(56) References Cited

U.S. PATENT DOCUMENTS

| | | | | |
|---|---|---|---|---|
| 2013/0208634 | A1* | 8/2013 | Ji | H04L 1/1812 370/280 |
| 2013/0242821 | A1 | 9/2013 | Wei | H04W 72/04 370/280 |
| 2014/0003387 | A1 | 1/2014 | Lee et al. | |
| 2014/0036853 | A1 | 2/2014 | Kim et al. | |
| 2014/0036889 | A1 | 2/2014 | Kim et al. | |
| 2014/0044105 | A1 | 2/2014 | Bontu et al. | |
| 2014/0071931 | A1 | 3/2014 | Lee et al. | |
| 2014/0112289 | A1 | 4/2014 | Kim et al. | H04W 16/14 370/329 |
| 2014/0328260 | A1* | 11/2014 | Papasakellariou | H04L 1/1861 370/329 |
| 2014/0378157 | A1* | 12/2014 | Wei | H04W 16/14 455/454 |
| 2015/0358827 | A1* | 12/2015 | Bendlin | H04W 16/14 455/454 |
| 2015/0365931 | A1* | 12/2015 | Ng | H04L 1/1893 370/329 |
| 2016/0157248 | A1* | 6/2016 | Lin | H04W 72/0406 370/329 |
| 2017/0328837 | A1 | 11/2017 | Kho et al. | |

FOREIGN PATENT DOCUMENTS

| | | | |
|---|---|---|---|
| EP | 3177096 | A1 | 6/2017 |
| RU | 2010109364 | A | 9/2011 |
| RU | 2011108466 | A | 9/2012 |
| WO | 2013006006 | A2 | 1/2013 |
| WO | 2013006988 | A1 | 1/2013 |
| WO | 2013116662 | A1 | 8/2013 |

OTHER PUBLICATIONS

Huawei, Ericsson, Qualcomm, HiSilicon: "Motivation of the New SI Proposal: Study on Licensed-Assisted Access using LTE", 3GPP TSG RAN Meeting #64, RP-140786, Jun. 9-12, 2014.

* cited by examiner ( a )

( b )

Special subframe, configuration 1,2,6 or 7

METHOD AND DEVICE FOR CONFIGURING TRANSMISSION OPPORTUNITY PERIOD IN WIRELESS ACCESS SYSTEM SUPPORTING UNLICENSED BAND

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a *reissue of U.S. patent application Ser. No. 16/205,425 filed Nov. 30, 2018 (now issued as U.S. Pat. No. 11,096,166), which is a* continuation application of U.S. patent application Ser. No. 15/328,837 filed Jan. 24, 2017, which is a National Stage Entry of International Application No. PCT/KR2015/008052 filed Jul. 31, 2015, which claims priority to U.S. Provisional Application Nos. 62/031,817 filed Jul. 31, 2014; 62/081,562 filed Nov. 18, 2014; 62/105,754 filed Jan. 21, 2015; 62/132,511 filed Mar. 13, 2015; 62/142,448 filed Apr. 2, 2015; and 62/166,122 filed May 25, 2015, all of which are incorporated herein by reference.

TECHNICAL FIELD

The present disclosure relates generally to a wireless access system supporting an unlicensed band, and more particularly, to a method for configuring a Transmission Opportunity Period (TxOP) and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present disclosure is to provide a method for efficiently transmitting and receiving data in a wireless access system supporting an unlicensed band.

Another object of the present disclosure is to provide various methods for configuring a Transmission Opportunity Period (TxOP) and apparatuses supporting the same in a wireless access system supporting an unlicensed band.

Another object of the present disclosure is to provide, if a TxOP includes a subframe having a different size from the size of a subframe of a primacy cell (PCell), a method for determining the subframe having a different size, and methods for determining a Transport Block Size (TBS) and configuring a Reference Signal (RS) for the subframe having a different size.

Another object of the present disclosure is to provide, if TxOPs are consecutively configured, methods for configuring a timing gap and/or transmitting a reservation signal without wasting subframes.

Another object of the present disclosure is to provide apparatuses supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure relates to a wireless access system supporting an unlicensed band. More particularly, the present disclosure provides a method for configuring a Transmission Opportunity Period (TxOP), and apparatuses supporting the same.

In an aspect of the present disclosure, provided herein is a method for configuring a TxOP in a wireless access system supporting an unlicensed band, including performing a carrier sensing (CS) procedure to determine whether a secondary cell (SCell) configured in the unlicensed band is idle, if the SCell is idle, transmitting a reservation signal during a predetermined time, and configuring a TxOP in the SCell. A starting time of a first subframe (SF) of the TxOP is aligned with an SF boundary, slot boundary, or symbol boundary of a primary cell (PCell) configured in a licensed band.

In another aspect of the present disclosure, an apparatus for configuring a TxOP in a wireless access system supporting an unlicensed band includes a transmitter, a receiver, and a processor configured to support a TxOP configuration. The processor is configured to perform a CS procedure to determine whether an SCell configured in the unlicensed band is idle by controlling the transmitter and the receiver, to transmit, if the SCell is idle, a reservation signal during a predetermined time by controlling the transmitter, and to configure a TxOP in the SCell. A starting time of a first SF of the TxOP is aligned with an SF boundary, slot boundary, or symbol boundary of a PCell configured in a licensed band.

In the aspects of the present disclosure, if it is said that an SCell is idle, this means that the SCell is not occupied by CS. In other words, the SCell is finally idle, upon completion of a CS procedure including a backoff operation or an LBT operation.

If the starting time of the first SF is aligned with a slot boundary of the PCell, the reservation signal may be transmitted until before the starting time of the first SF after the CS procedure.

If the starting time of the first SF is aligned with a slot boundary or symbol boundary of the PCell, the first SF is configured as a partial SF (pSF) having a smaller length than an SF of the PCell.

If one SF is divided into T points and the first SF starts at a $k^{th}$ point among the T points, the number $N_{PRB}$ of physical resource blocks (PRBs) in the first SF may be calculated by the following equation.

$$N_{PRB} = \max\left\{\left\lfloor N'_{PRB} \times \frac{k}{T} \right\rfloor, 1\right\} \quad \text{[Equation]}$$

Herein, $N'_{PRB}$ represents a total number of allocated PRBs, and k and T are positive integers.

A demodulation reference signal (DM-RS) transmitted in the first SF may be allocated only to a second slot in which the first SF is configured.

If the starting time of the first SF is aligned with a symbol boundary of the PCell, it may be determined whether the first SF is configured independently, or concatenated to a next SF into an over SF (oSF), based on a threshold set as a number of OFDM symbols.

If the first SF is configured to be an oSF, one SF is divided into T points, and the first SF starts at a $k^{th}$ point among the T points, the number $N_{PRB}$ of PRBs in the first SF may be calculated by the following equation.

$$N_{PRB} = \max\left\{\left\lfloor N'_{PRB} \times \frac{k}{T} \right\rfloor, 1\right\} \quad \text{[Equation]}$$

Herein, $N'_{PRB}$ represents a total number of allocated PRBs, and k and T are positive integers.

If the first SF is configured to be an oSF, one SF is divided into T points, and the first SF starts at a $k^{th}$ point among the T points, the number $N_{PRB}$ of PRBs in the first SF may be calculated by the following equation.

$$TBS(I_{TBS}, N_{PRB}) = \left\lfloor TBS(I_{TBS}, N'_{PRB}) \times \frac{T+k}{T} \right\rfloor \quad \text{[Equation]}$$

Herein, $N'_{PRB}$ represents a total number of allocated PRBs, $I_{TBS}$ represents an index indicating a transport block size (TBS) for the first SF, and k and T are positive integers.

If the first SF is configured to be an oSF, a DM-RS transmitted in the first SF may be allocated only within the concatenated next SF.

If two or more TxOPs are configured consecutively, a first SF of each of the TxOPs may be configured to have a fixed length smaller than a length of one SF. Herein, a specific timing gap may be configured before a second TxOP starts after the end of the first TxOP among the consecutive TxOPs.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

First, data can be efficiently transmitted and received in a wireless access system supporting an unlicensed band.

Secondly, various methods for configuring a Transmission Opportunity Period (TxOP) and apparatuses supporting the same in a wireless access system supporting an unlicensed band can be provided.

Thirdly, if a TxOP includes a subframe having a different size from the size of a subframe of a primacy cell (PCell), a method for determining the subframe having a different size, and methods for determining a Transport Block Size (TBS) and configuring a Reference Signal (RS) for the subframe having a different size can be provided.

Fourthly, if TxOPs are consecutively configured, a timing gap and/or a reservation signal may be configured and transmitted without wasting subframes.

It will be apparent to those skilled in the art that various modifications and variations can be made in the present disclosure without departing from the technical features or scope of the disclosures. Thus, it is intended that the present disclosure covers the modifications and variations of this disclosure provided they come within the scope of the appended claims and their equivalents.

BRIEF DESCRIPTION OF THE DRAWINGS

The accompanying drawings, which are included to provide a further understanding of the disclosure, illustrate embodiments of the disclosure and together with the description serve to explain the principle of the disclosure. In the drawings.

BEST MODE FOR CARRYING OUT THE DISCLOSURE

Figure 1:
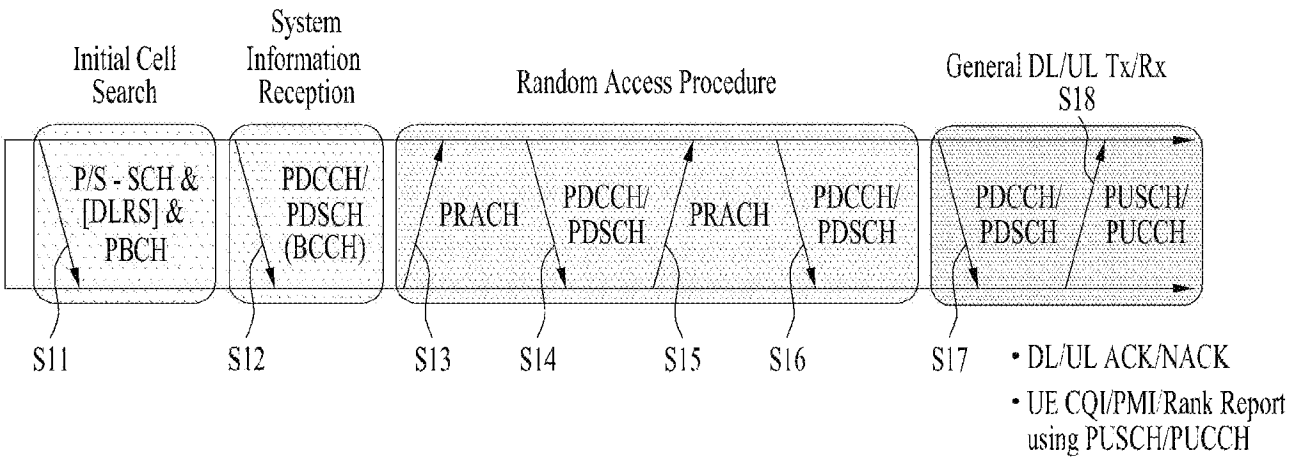
FIG. 1 is a view illustrating physical channels and a signal transmission method using the physical channels.

Embodiments of the present disclosure as described below in detail relate to a wireless access system supporting an unlicensed band, and provide a method for configuring a Transmission Opportunity Period (TxOP) and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SCFDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
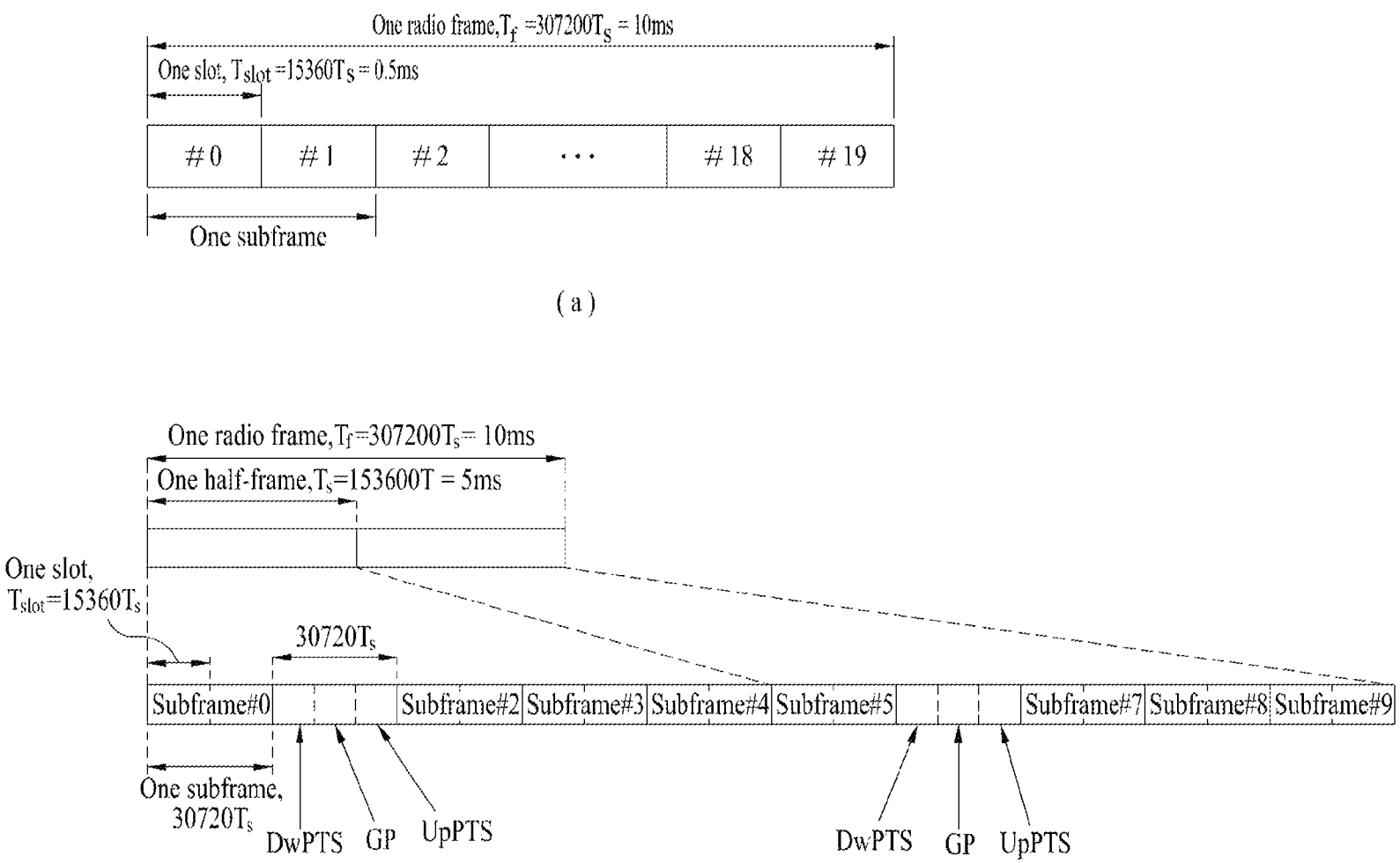
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
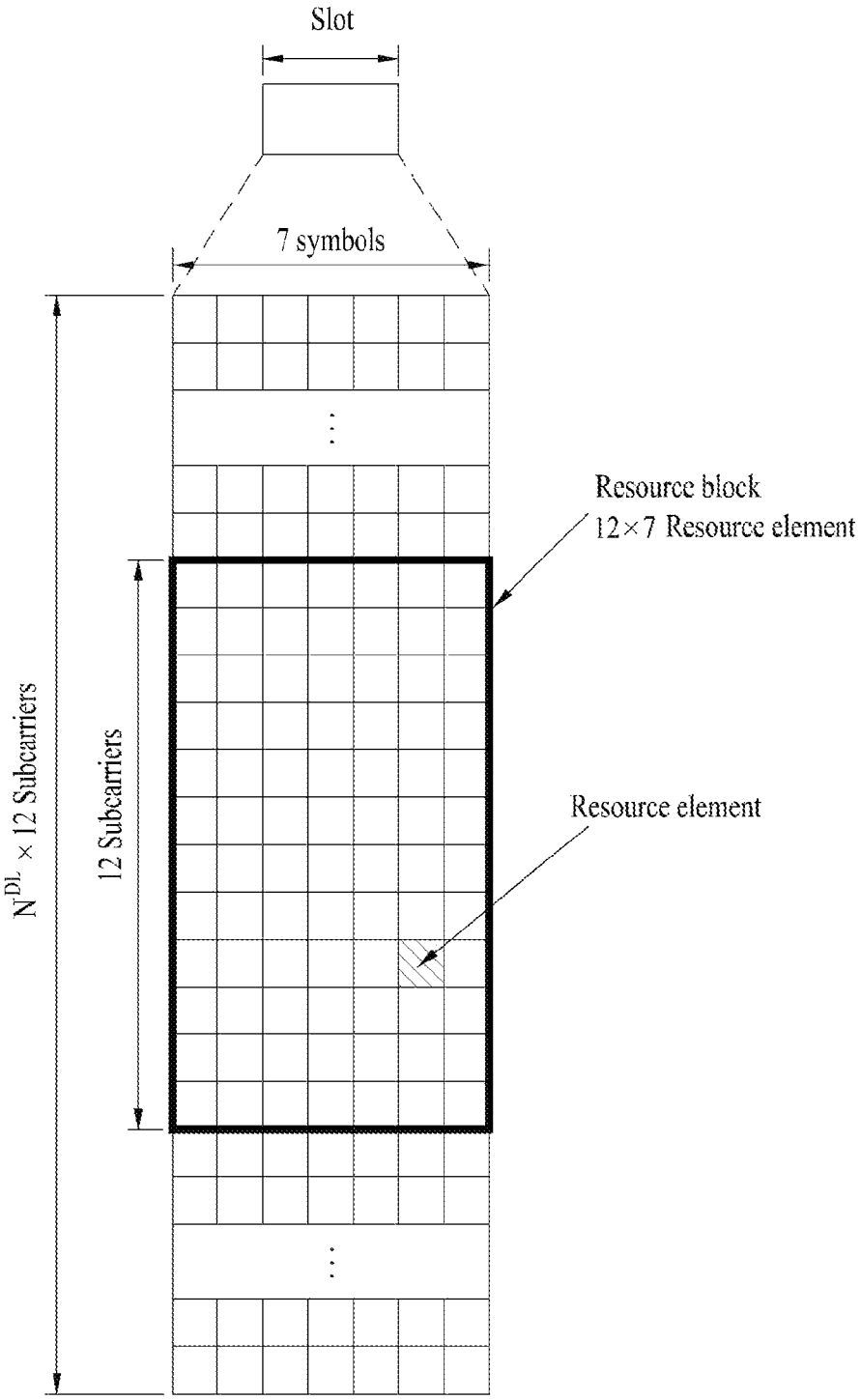
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
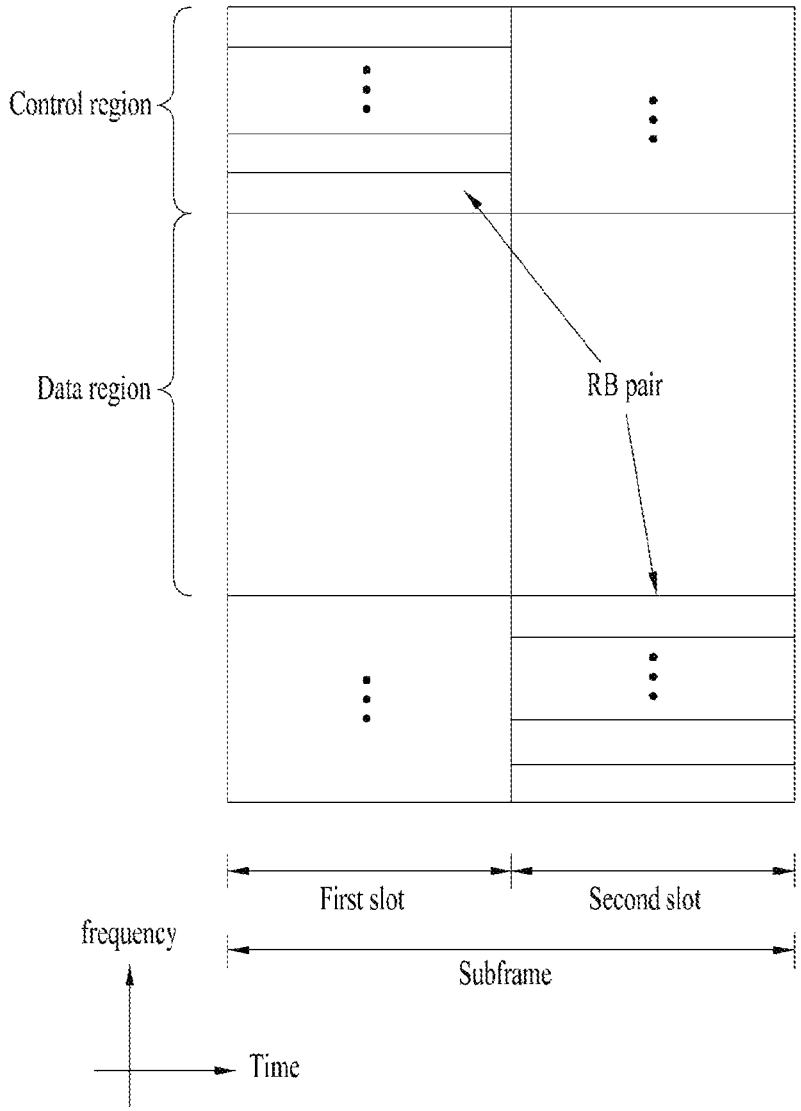
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
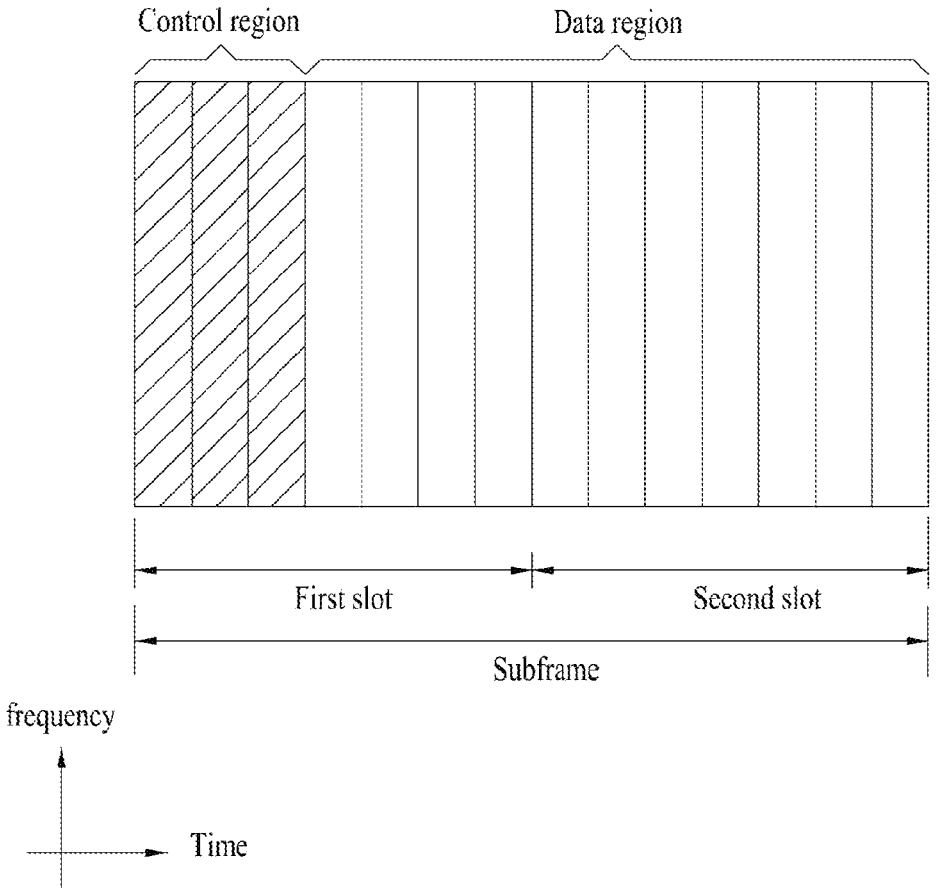
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REB}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO (mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);

(2) Transmission mode 2: Transmit diversity;

(3) Transmission mode 3: Open-loop spatial multiplexing when the number of layer is larger than 1 or Transmit diversity when the rank is 1;

(4) Transmission mode 4: Closed-loop spatial multiplexing;

(5) Transmission mode 5: MU-MIMO;

(6) Transmission mode 6: Closed-loop rank-1 precoding;

(7) Transmission mode 7: Precoding supporting a single layer transmission, which is not based on a codebook (Rel-8);

(8) Transmission mode 8: Precoding supporting up to two layers, which are not based on a codebook (Rel-9);

(9) Transmission mode 9: Precoding supporting up to eight layers, which are not based on a codebook (Rel-10); and

(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k-1}$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k + m) \bmod \lfloor N_{CCE,k}/L \rfloor\} + i \qquad \text{[Equation 1]}$$

Herein, $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Search space $S_k^{(L)}$ | | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \qquad \text{[Equation 2]}$$

Herein, $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
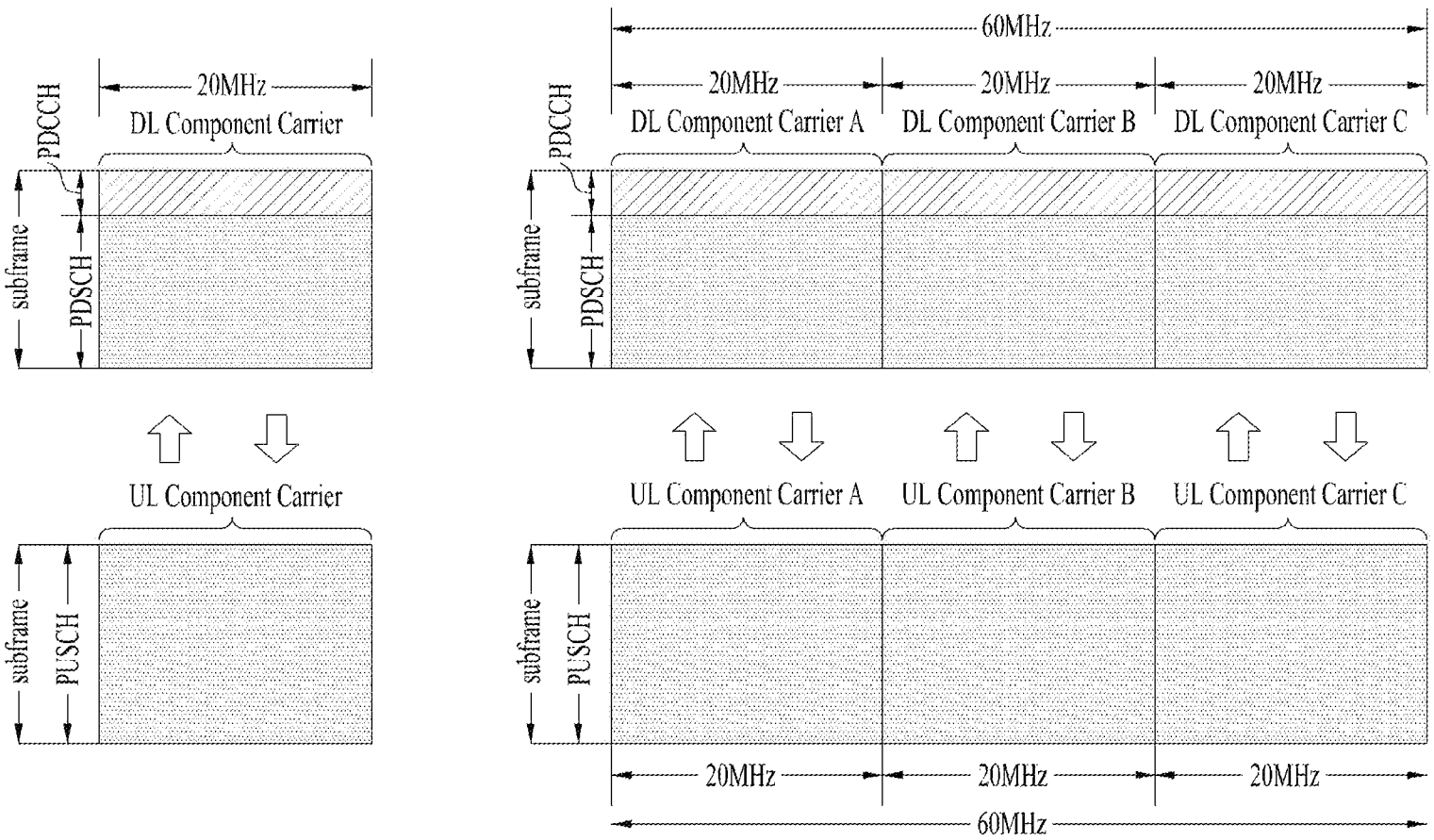
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
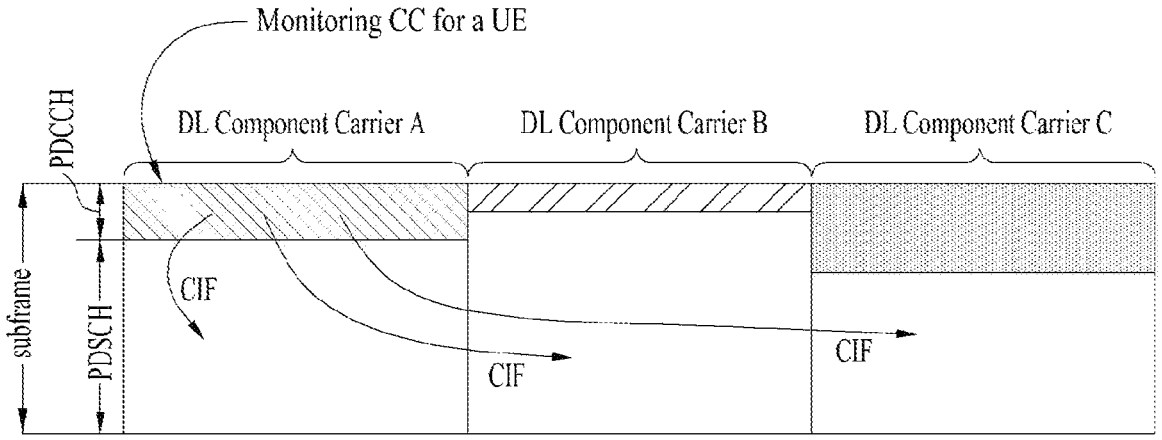
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
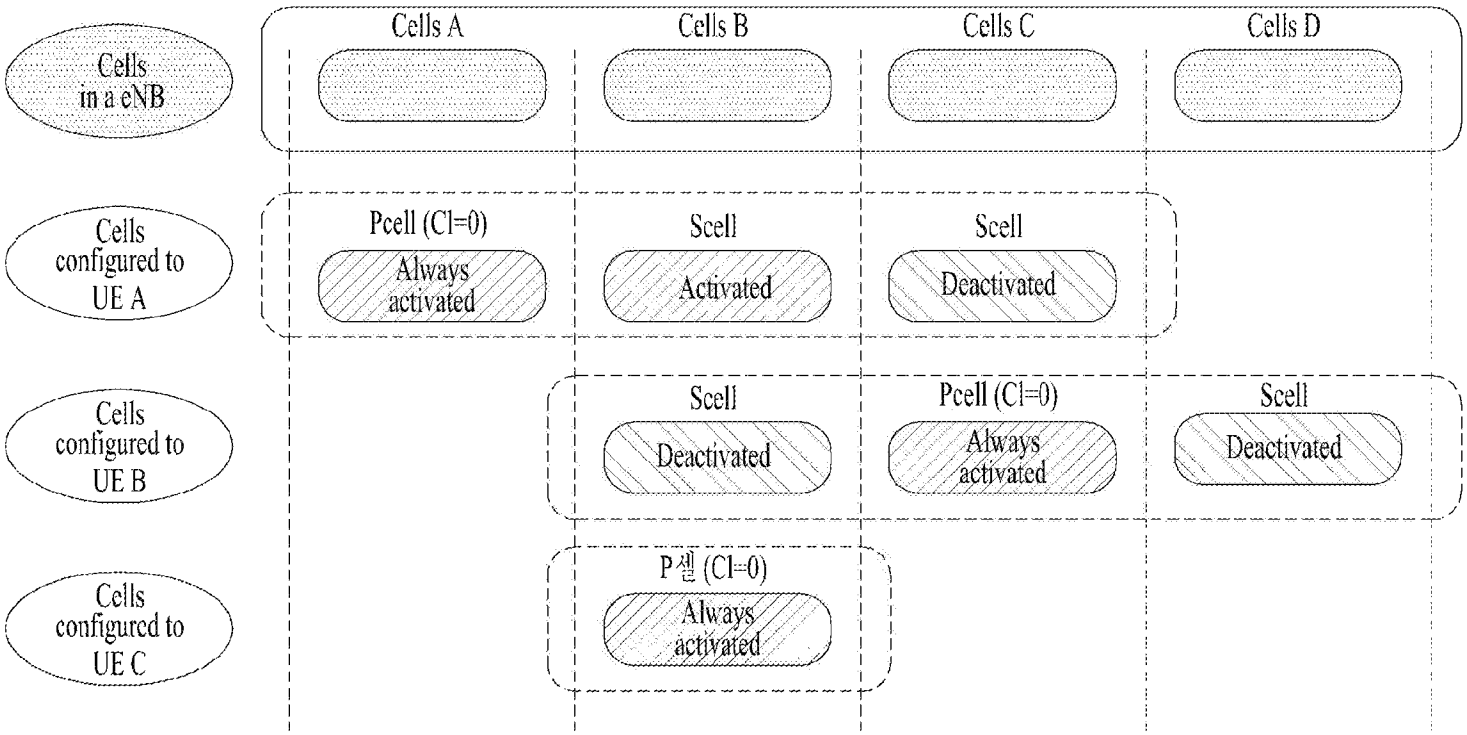
FIG. 8 is a view illustrating an exemplary serving cell configuration based on cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of PCell. In this case, PCell is always activated, and SCell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment-Based CoMP Operation

Hereinafter, a cooperation multi-point (CoMP) transmission operation applicable to the embodiments of the present disclosure will be described.

Figure 9:
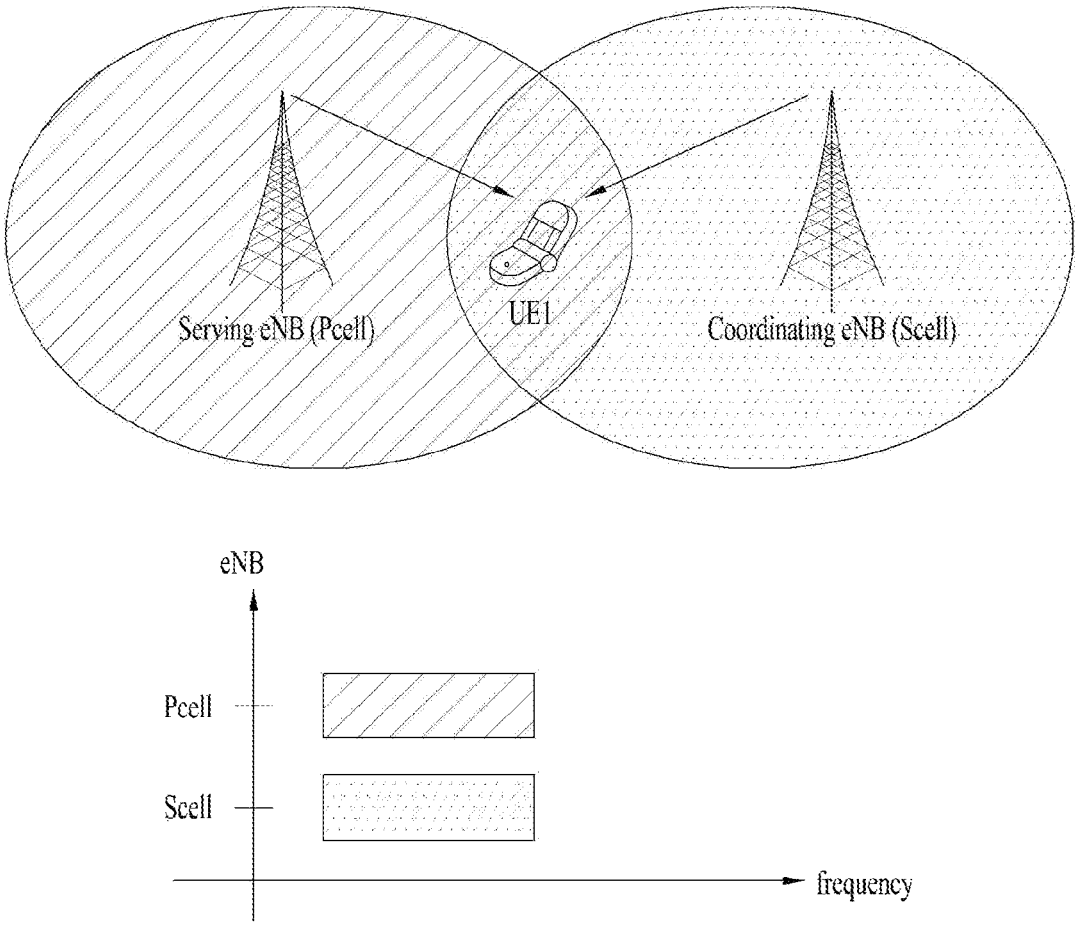
FIG. 9 is a conceptual view of a Coordinated Multi-Point (CoMP) system operating in a CA environment.

In the LTE-A system, CoMP transmission may be implemented using a carrier aggregation (CA) function in the LTE. FIG. 9 is a conceptual view illustrating a CoMP system operating based on a CA environment.

In FIG. 9, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 9 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.4 Reference Signal (RS)

Now, a description will be given of RSs which may be used in embodiments of the present disclosure.

Figure 10:
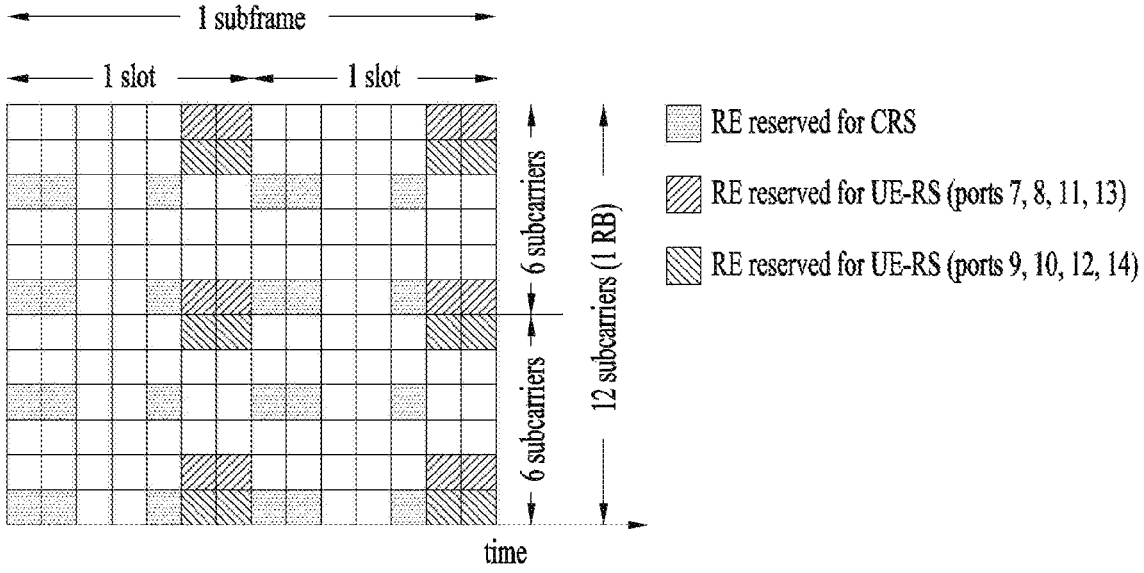
FIG. 10 is a view illustrating an exemplary subframe to which UE-specific Reference Signals (UE-RSs) are allocated, which may be used in embodiments of the present disclosure.

FIG. 10 illustrates an example of a subframe to which UE-RSs are allocated, which may be used in embodiments of the present disclosure.

Referring to FIG. 10, the subframe illustrates REs occupied by UE-RSs among REs in one RB of a normal DI, subframe having a normal CP.

UE-RSs are transmitted on antenna port(s) p=5, p=7, p=8 or p=7, 8, . . . , ν+6 for PDSCH transmission, where ν is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 9, in a PRB having frequency-domain index nPRB assigned for PDSCH transmission with respect to p=7, p=8, or p=7, 8, . . . , ν+6, a part of UE-RS sequence r(m) is mapped to complex-valued modulation symbols.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DM-RS REs in an RB to which a PDSCH for a specific UE in a specific subframe is mapped is the same per UE-RS ports. Notably, in RBs to which the PDSCH for different UEs in the same subframe is allocated, the number of DM-RS REs included in the RBs may differ according to the number of transmitted layers.

The UE-RS can be used as the DM-RS in the embodiments of the present disclosure.

2.5 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 11:
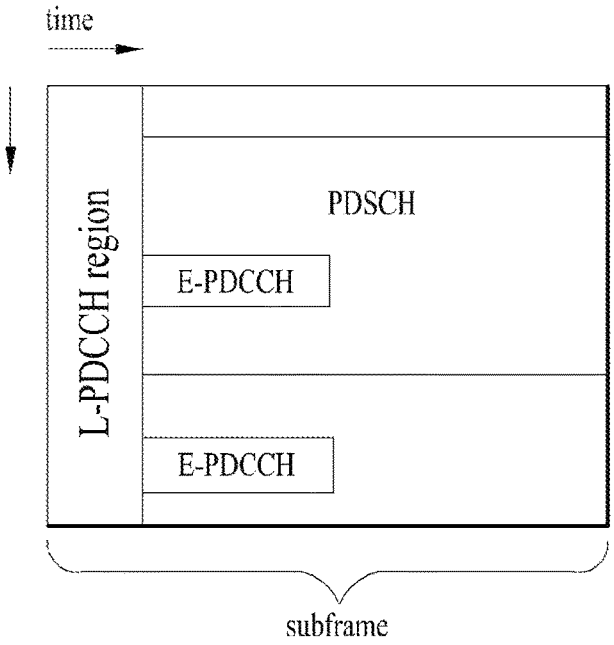
FIG. 11 is a view illustrating exemplary multiplexing of legacy Physical Downlink Control Channel (PDCCH), Physical Downlink Shared Channel (PDSCH), and Evolved-PDCCH (E-PDCCH) in an LTE/LTE-A system.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 11 illustrates an example that legacy PDCCH, PDSCH and E-PDCCH, which are used in an LTE/LTE-A system, are multiplexed.

3. LTE-U System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 12:
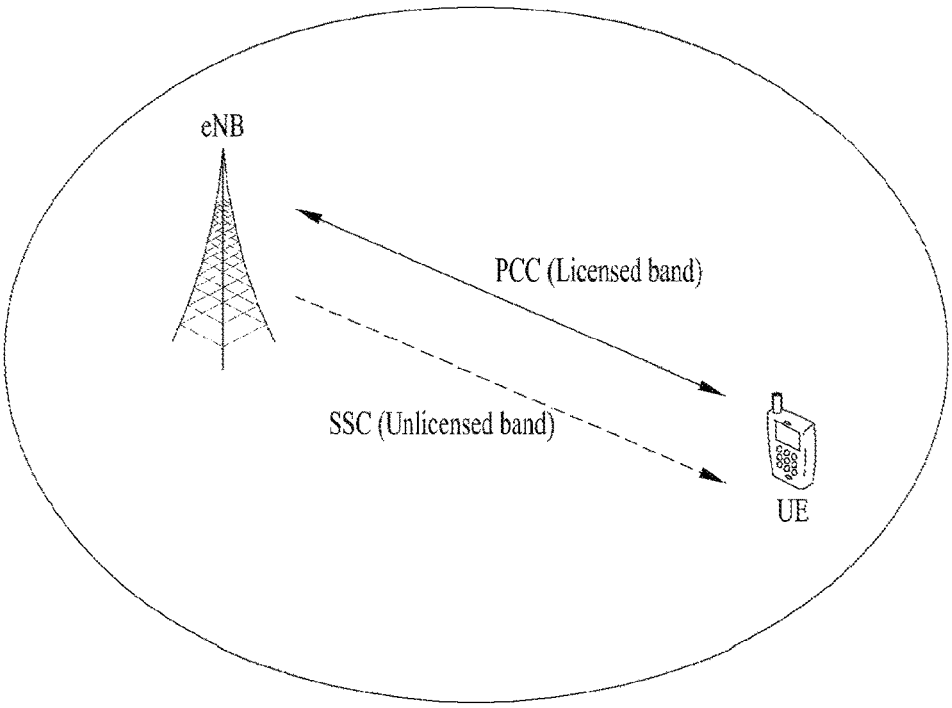
FIG. 12 is a view illustrating an exemplary CA environment supported in an LTE-Unlicensed (LTE-U) system.

FIG. 12 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 12, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 12 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

3.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 13:
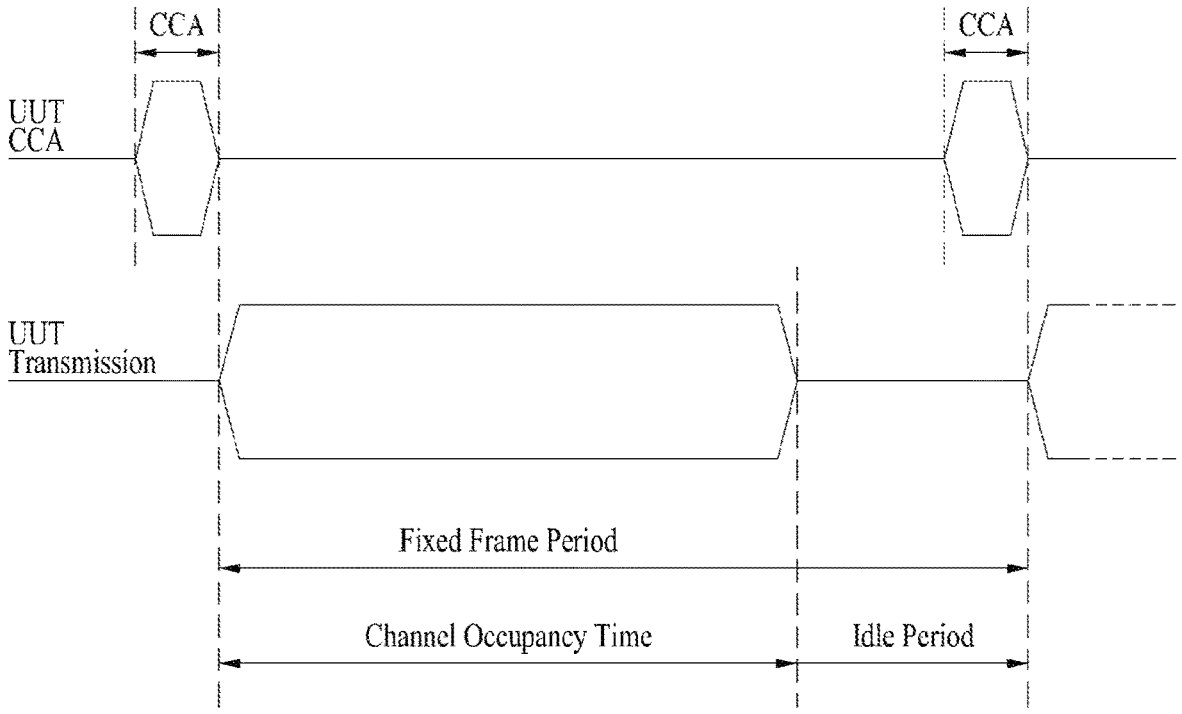
FIG. 13 is a view illustrating an exemplary Frame Based Equipment (FBE) operation as one of Listen-Before-Talk (LBT) operations.

FIG. 13 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 14:
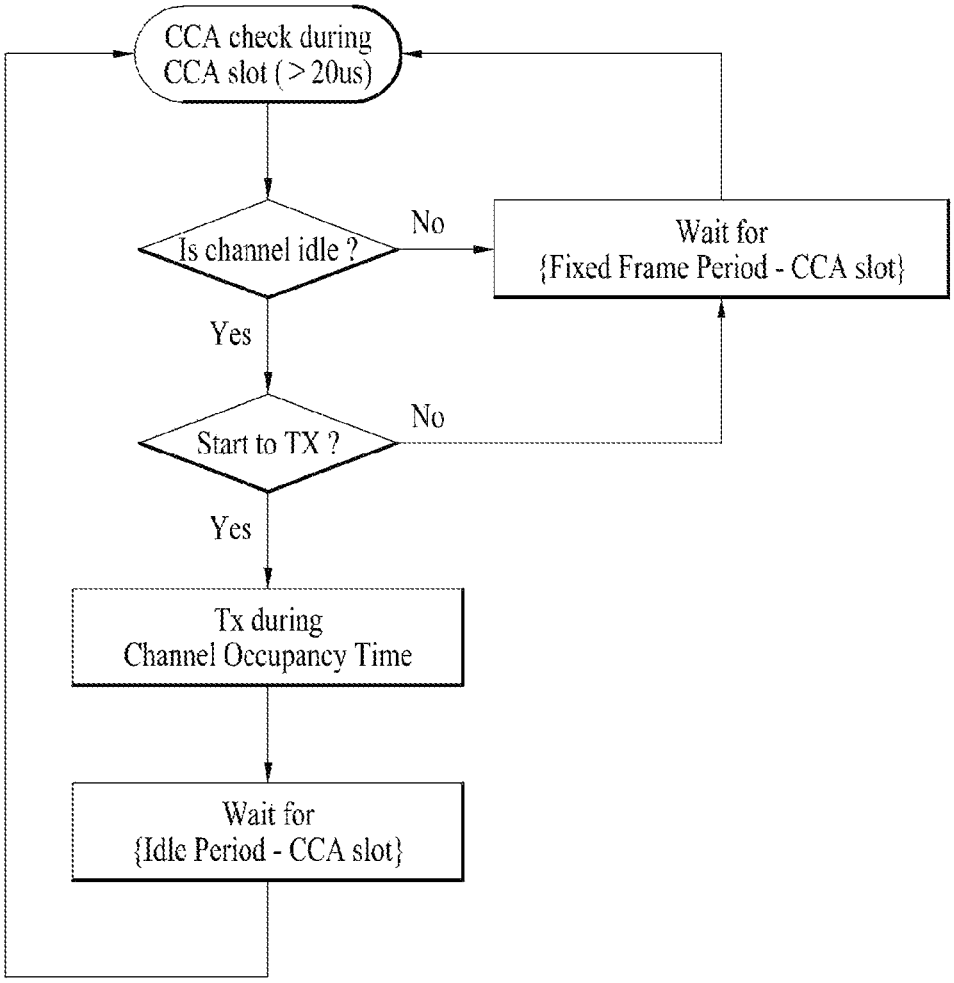
FIG. 14 is a block diagram illustrating the FBE operation.

FIG. 14 is a block diagram illustrating the FBE operation.

Referring to FIG. 14, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

Figure 15:
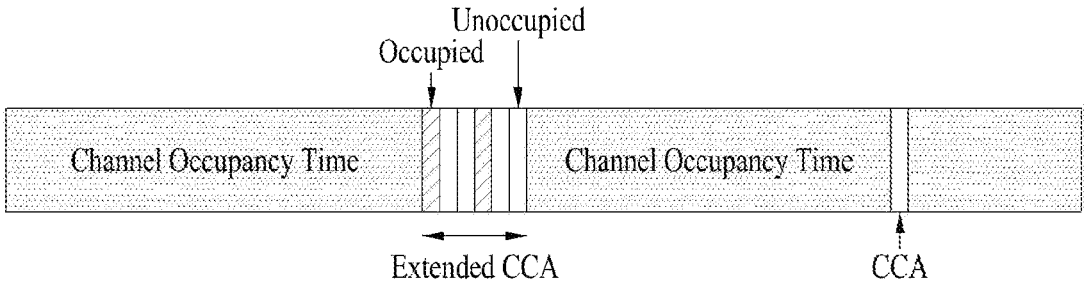
FIG. 15 is a view illustrating an exemplary Load Based Equipment (LBE) operation as one of the LBT operations.
Figure 15:
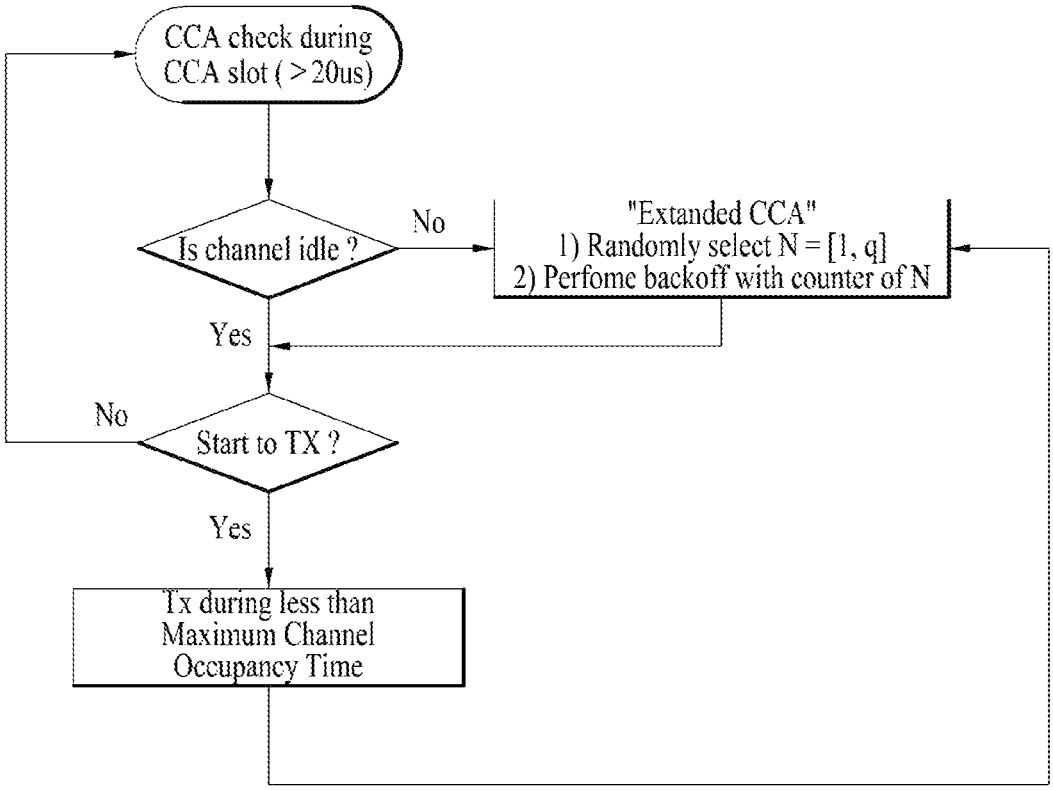

FIG. 15 is a view illustrating an exemplary LBE operation as one of the LBT operations.

Referring to FIG. 15(a), in LBE, the communication node first sets q ($q \in \{4, 5, \ldots, 32\}$) and then performs CCA during one CCA slot.

FIG. 15(b) is a block diagram illustrating the LBE operation. The LBE operation will be described with reference to FIG. 15(b).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N ($N \in \{1, 2, \ldots, q\}$) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

4. TxOP Configuration Method and Reservation Signal Transmission Method

A description will be given below of methods for transmitting a reservation signal to occupy a channel and methods for configuring a TxOP, when the channel is determined to be idle after the above-described CS (i.e., LBT) operation. In embodiments of the present disclosure, if it is said that 'an SCell is determined to be idle', this means that the SCell is determined to be idle during an LBT operation or is determined to be idle repeatedly as many times as a backoff count during a backoff operation. In other words, an idle-state SCell means that upon completion of a CS procedure including a backoff operation or an LBT operation, the SCell is finally idle.

For the convenience of description, it is assumed that the size M of a TxOP is 3 (i.e., three subframes) in embodiments of the present disclosure. It is also assumed that a PCell operates in the LTE-A system using a licensed band and an SCell operates in an unlicensed band (e.g., WiFi, BT, or the like). For details, refer to FIG. 12.

4.1 Methods for Configuring TxOP and Transmitting Reservation Signal in Case of Alignment with Subframe (SF) Boundary of PCell Embodiments as set forth below are for a case in which an SCell is configured to operate in alignment with an SF boundary of a PCell.

Figure 16:
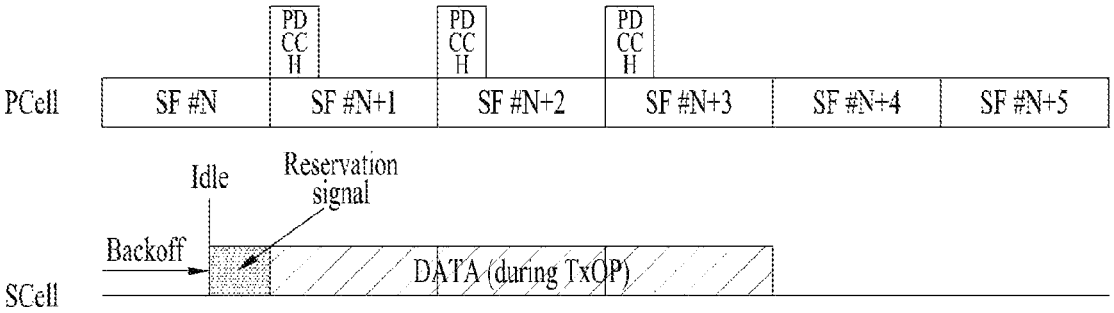
FIGS. 16 and 17 are views illustrating a method for transmitting a reservation signal.
Figure 17:
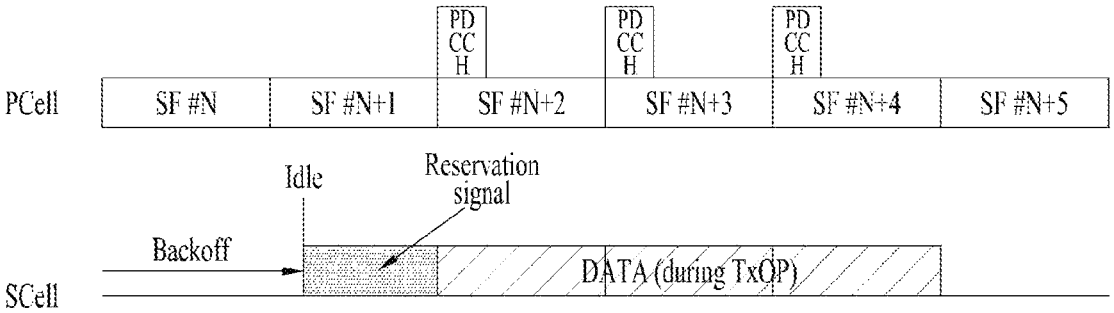

FIGS. 16 and 17 are views illustrating a method for transmitting a reservation signal.

FIGS. 16 and 17 illustrate a case in which an SCell is configured to operate in alignment with an SF boundary of a PCell. If an eNB actually transmits data in the SCell in alignment with an SF boundary of the LTE-A system as illustrated in FIG. 16, there may exist a timing gap between a time of determining the idle state of the SCell and an actual data transmission time. Particularly, since the SCell is defined in an unlicensed band, a specific eNB and a specific UE may use the SCell not exclusively but by CS-based contention. Therefore, another system (e.g., a WiFi system) may attempt to transmit information during the timing gap.

Accordingly, to prevent another system from attempting information transmission during the timing gap of the SCell, the eNB may configure transmission of a reservation signal. The reservation signal may be a kind of "dummy information", "a copy of a part of a PDCCH", or "an RS such as CRS or DM-RS" that the eNB transmits to reserve the SCell as its resources. The reservation signal may be transmitted during the timing gap (i.e., until before the actual data transmission time after the time of determining the idle state of the SCell).

Referring to FIG. 16, the eNB may determine whether the SCell is in the idle state to transmit data in the SCell. That is, the eNB determines whether the channel is idle by CS, and performs a backoff operation or an LBT operation according to the determination. If the eNB determines the SCell to be idle in SF #N and thus ends the backoff operation or the LBT operation, the eNB may transmit a reservation signal until before the next SF, SF 190 N+1, to thereby prevent another system from occupying the SCell.

However, if the eNB should transmit the reservation signal until the next SF boundary after the time of determining the SCell to be idle in order to align an SF boundary of the SCell with an SF boundary of the PCell, the eNB should transmit the reservation signal during almost one SF period (i.e., 1 ms), as illustrated in FIG. 17. Referring to FIG. 17, if the eNB determines that the SCell is idle shortly after the start of SF #N+1 after the backoff operation, the eNB should continue transmitting the reservation signal in SF #N+1 in order to occupy the SCell in alignment between an SF boundary of the SCell and an SF boundary of the PCell.

If the transmission period of the reservation signal is too long as described above, data transmission performance of the LTE/LTE-A system may be degraded, and the performance of a system (e.g., WiFi) operating in an unlicensed band may also be degraded because the reservation signal may act as interference.

4.1.1. Maximum Value Setting

To solve the above problem, a maximum value (i.e., X ms) of a reservation signal transmission period may be preset. For example, the maximum value of the reservation signal transmission period may be set to one slot (i.e., 0.5 msec) or n OFDM symbols. X or n may be preset or set by higher layer signaling or physical layer signaling.

If the maximum value of the reservation signal transmission period is set to one slot, the eNB may start CS in the second slot of every SF, and transmit a reservation signal from a time of determining the SCell to be idle until the next SF of the PCell.

Figure 18:
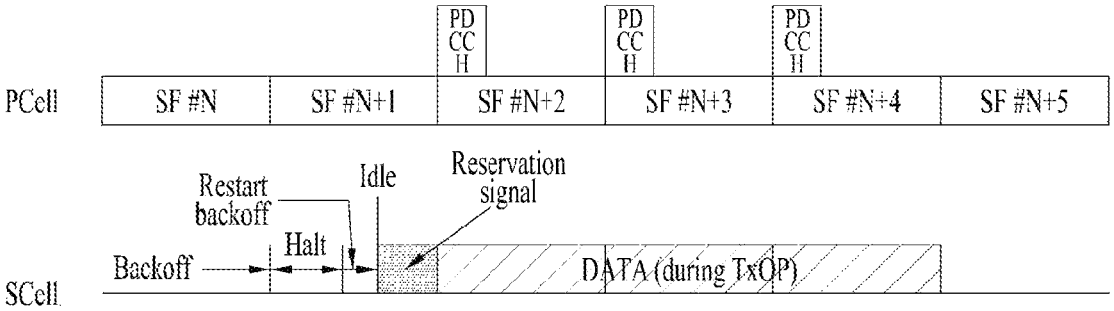
FIG. 18 is a view illustrating an embodiment of setting a maximum value for a reservation signal transmission period.

FIG. 18 is a view illustrating an embodiment of setting a maximum value for a reservation signal transmission period.

Referring to FIG. 18, if the eNB determines that a channel of the SCell is kept busy from the second slot of SF #N to the starting time of SF #N+1, the eNB may halt CS during one slot from the starting time of SF #N+1, and start to resume the CS in the second slot of SF #N+1. Subsequently, if the eNB determines the channel to be idle, the eNB may transmit a reservation signal until before the starting time of the next SF, SF #N+2, and start to transmit data in SF #N+2. If the size M of a TxOP is preset by higher layer signaling, a UE may receive data in the SCell during the TxOP.

4.1.2 Adjustment of Starting Time of SF in SCell

Figure 19:
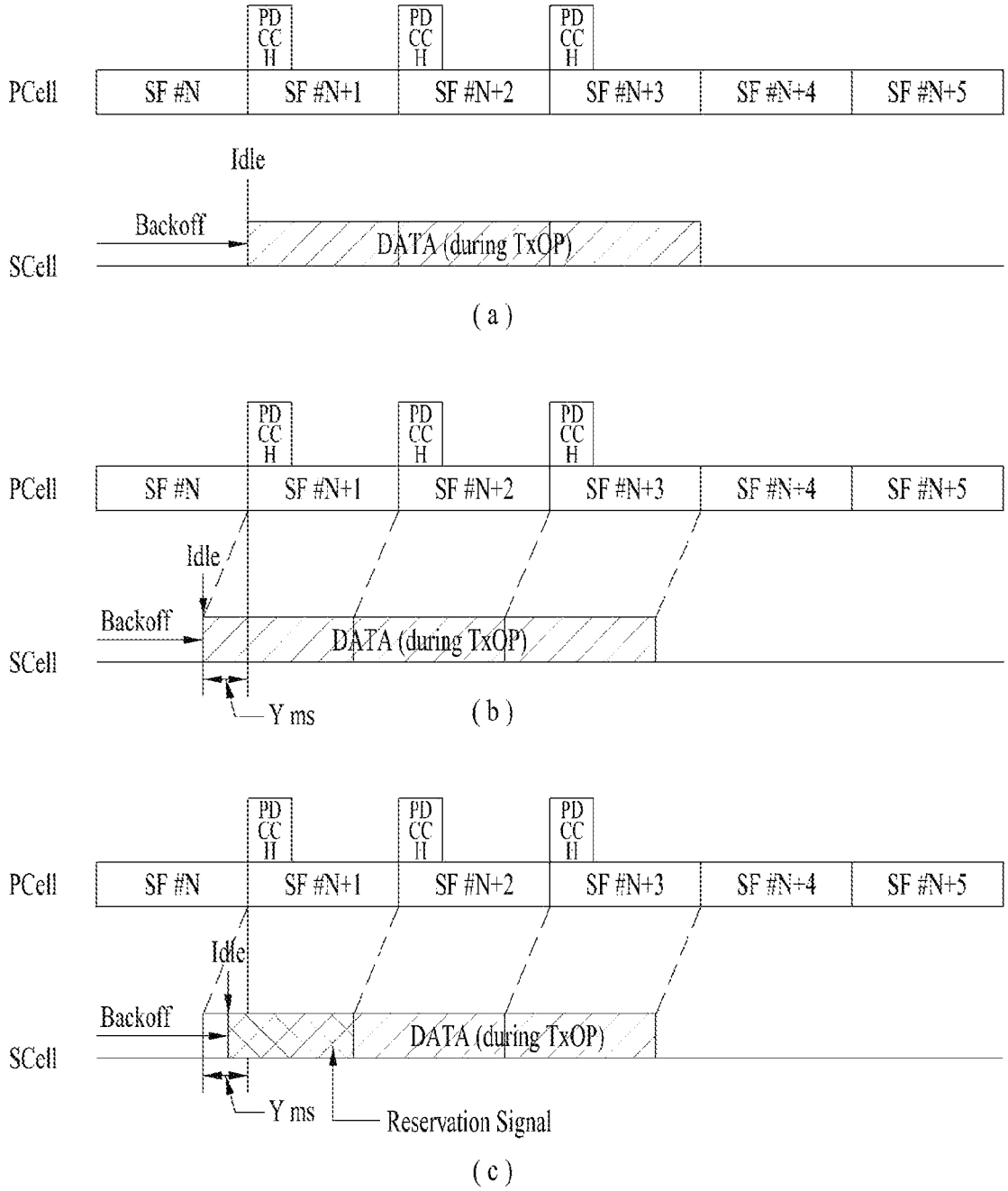
FIG. 19 is a view illustrating a method for adjusting the starting time of a SubFrame (SF) in a Secondary Cell (SCell) according to an operation of a Primary Cell (PCell)

FIG. 19 is a view illustrating a method for adjusting the starting time of an SF in an SCell according to an operation of a PCell.

As illustrated in FIG. 19(a), a time of determining the SCell to be idle may be aligned with an SF boundary of the PCell. If at least Y ms is required to perform CCS in the PCell, it may be impossible to perform CCS of the PCell in SF #N+1 of the SCell due to the processing delay time of Y ms.

To solve the problem, an SF starting time of the SCell may be advanced by Y ms. For example, as SF #N+1 of the SCell is configured to start Y ms earlier than SF #N+1 of the PCell as illustrated in FIG. 19(b), even though the channel is determined to be idle at a boundary of SF #N+1 of the SCell, the eNB may prepare for CCS for Y ms in the PCell.

Herein, Y may be predetermined in the system, or may be configured semi-statically by higher layer signaling or dynamically by physical layer signaling (e.g., transmission of an (E)PDCCH) in each SF. The interval between SFs in the PCell and the SCell may be represented as the number of OFDM symbols.

The eNB may be configured not to perform CS in the SCell during Y ms.

Or if the eNB determines the channel to be idle by CS during Y ms, the eNB may transmit the reservation signal during a timing gap until shortly before the starting time of the next SF, SF #N+1 of the SCell (refer to FIG. 19(c)).

4.2 Method for Changing Size of First SF in TxOP

If the reservation signal is transmitted to align an SF boundary of the SCell with an SF boundary of the PCell as described in Section 4.1, loss may occur in terms of spectral efficiency. To reduce the loss of spectral efficiency, it may be configured that if a channel of the SCell is idle, data is transmitted in the SCell despite misalignment between the SF boundary of the SCell and the SF boundary of the PCell.

For example, data transmission efficiency may be increased by configuring the first SF of a TxOP in the SCell in such a manner that the length of the first SF may be changed. Additionally, the reservation signal may be configured to be transmitted to align an SF boundary of the SCell with a slot boundary of the PCell. Now, a description will be given of methods for configuring a TxOP in an SCell in alignment with a slot boundary of a PCell.

Figure 20:
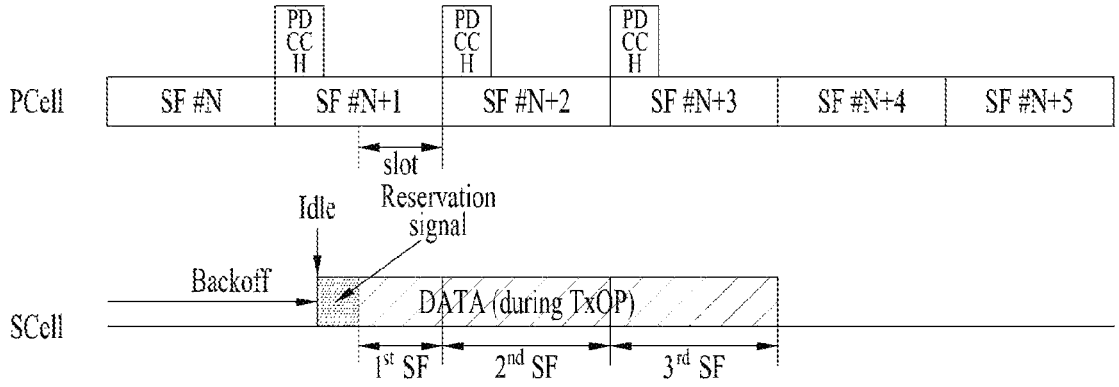
FIG. 20 is a view illustrating a method for aligning an SF boundary of an SCell with a slot boundary of a PCell.

FIG. 20 is a view illustrating a method for aligning an SF boundary of an SCell with a slot boundary of a PCell.

It may be configured that data transmission (i.e. a TxOP) of the SCell starts at a slot boundary of the PCell. For example, referring to FIG. 20, if determining a channel of the SCell to be idle in the first slot of SF #N+1, the eNB may transmit the reservation signal only until the boundary of the second slot of SF #N+1. Herein, since a boundary of the SCell may be aligned with a slot boundary of the PCell, the TxOP of the SCell may start in the second slot of SF #N+1. That is, the first SF of the TxOP can be not a full SF but a partial SF (pSF) including only one slot. The eNB may transmit data in the first SF of the SCell aligned with a slot boundary of SF #N+1 of the PCell. Each of the remaining SFs of the TxOP is of the same length as an SF of the PCell, and the end of the last SF of the TxOP may be aligned with the end of SF #N+3 in the PCell.

In another aspect of the embodiment, a time point (i.e., the starting time of a TxOP) at which data transmission may start in the SCell may be set to a symbol boundary of the PCell, not a slot boundary of the PCell. Or the start of the TxOP in the SCell may be set only to a specific time point of the PCell. For example, the TxOP of the SCell may start at the boundary of an odd-numbered or even-numbered symbol of the PCell.

In embodiments of the present disclosure, the first SF of the TxOP in the SCell may be configured to be a pSF shorter than a legacy SF of 1 ms. Therefore, methods for determining a Transport Block Size (TBS) for the first SF of a TxOP and methods for transmitting an RS in the first SF of the TxOP will be described below.

4.2.1 TBS Determination Method-1

According to the LTE/LTE-A system standard TS 36.213, 7.1.7, a TBS is determined according to a 5-bit Modulation and Coding Scheme (MCS) field (i.e., $I_{MCS}$) included in DCI and the number of Physical Resource Blocks (PRBs), $N_{PRB}$. $N_{PRB}$ is determined in the manner described in [Table 6].

TABLE 6

<TS 36.213 7.1.7>
...
- set $N_{PRB}'$ to the total number of allocated PRBs based on the procedure defined in subclause 7.1.6.
  if the transport block is transmitted in DwPTS of the special subframe in frame structure type 2, then
  - for special subframe configuration 9 with normal cyclic prefix or special subframe configuration 7 with extended cyclic prefix:
    - set the Table 7.1.7.2.1-1 column indicator $N_{PRB} = \max\{\lfloor N_{PRB}' \times 0.375 \rfloor, 1\}$
  - for other special subframe configurations:
    - set the Table 7.1.7.2.1-1 column indicator $N_{PRB} = \max\{\lfloor N_{PRB}' \times 0.75 \rfloor, 1\}$, else, set the Table 7.1.7.2.1-1 column indicator $N_{PRB} = N_{PRB}'$.

If the first SF of a TxOP in an SCell is a pSF, a TBS may be determined as follows. When one SF is divided into T points and the first SF starts at a $k^{th}$ point among the T points, $N_{PRB}$ for the pSF may be calculated by the following [Equation 3].

$$N_{PRB} = \max\left\{\left\lfloor N'_{PRB} \times \frac{k}{T} \right\rfloor, 1\right\} \quad \text{[Equation 3]}$$

For example, if a normal CP is used in the SCell and the SCell operates in alignment with a symbol boundary of a PCell, T may be set to 14 and k may represent the index of an OFDM symbol in the first SF. Herein, k may be indicated by DCI on a PDCCH transmitted in SF #N+2.

Or if an extended CP is used in the SCell and the SCell operates in alignment with a symbol boundary of the PCell, T may be set to 12 and k may represent the index of an OFDM symbol in the first SF.

4.2.2 TBS Determination Method-2

Among the methods proposed in Section 4.2.1, an SF including as many OFDM symbols as defined by a legacy DwPTS configuration will be described. That is, if the first SF of a TxOP is configured as in a DwPTS configuration described in [Table 1], $N_{PRB}$ may be calculated.

For example, if the first SF includes 7 OFDM symbols, $N_{PRB}$ may be calculated by $N_{PRB}=\max\{\lfloor N'_{PRB}\times 0.375\rfloor, 1\}$ like special SF configuration 9 in [Table 1]. If the first SF includes 9 to 12 OFDM symbols, $N_{PRB}$ may be calculated by $N_{PRB}=\max\{\lfloor N'_{PRB}\times 0.75\rfloor, 1\}$ like special SF configurations 1, 2, 3, 4, 6, 7 and 8. The same thing is applicable to an extended CP case.

4.2.3 RS Configuration Method-1

Figure 21:
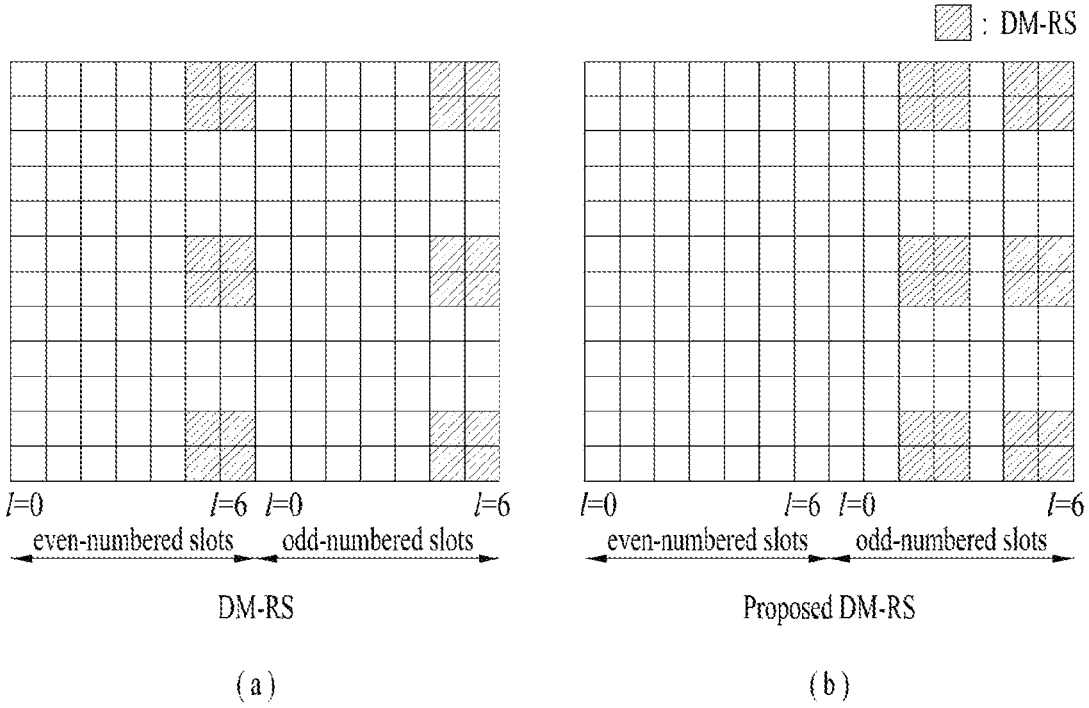
FIG. 21 is a view illustrating configurations of Reference Signals (RSs) transmitted in an SCell.

FIG. 21 is a view illustrating configurations of RSs transmitted in an SCell.

In the LTE/LTE-A system, the eNB transmits DM-RSs configured as illustrated in FIG. 21(a) to help a UE with data demodulation. However, if the first SF of a TxOP in an SCell is configured to be shorter than the length of the legacy SF, 1 ms, DM-RSs sufficient for data demodulation may not be ensured.

For example, if the length of the first SF is equal to or smaller than Q, DM-RSs may be transmitted in the pattern illustrated in FIG. 21(b). Q may be configured semi-statically by higher layer signaling or dynamically by physical layer signaling. For example, Q may be defined to be one slot. That is, if the first SF includes only one slot, DM-RSs allocated to the first SF may be configured as illustrated in FIG. 21(b).

The reason for configuring DM-RSs in the pattern illustrated in FIG. 21(b) is that since the former boundary of the first SF may vary according to a channel state-based CS result, sufficient DM-RSs may not be ensured. Therefore, DM-RSs are preferably allocated to the second slot.

4.2.4 Setting of SF Length Based on Threshold

If an SCell operates in alignment with a symbol boundary of a PCell, the first SF of a TxOP may include only one OFDM symbol in an extreme case.

However, it may be more efficient in terms of SCell management to configure an SF having a long TTI by concatenating one SF with another SF than to configure an independent SF with too small a number of OFDM symbols. That is, it may be determined whether to configure an SF by concatenating the first SF with another SF based on a specific threshold.

The threshold may be a predetermined fixed value in the system, or may be configured semi-statically by higher layer signaling or dynamically by physical layer signaling. For example, the threshold may be set as the number of OFDM symbols.

Figure 22:
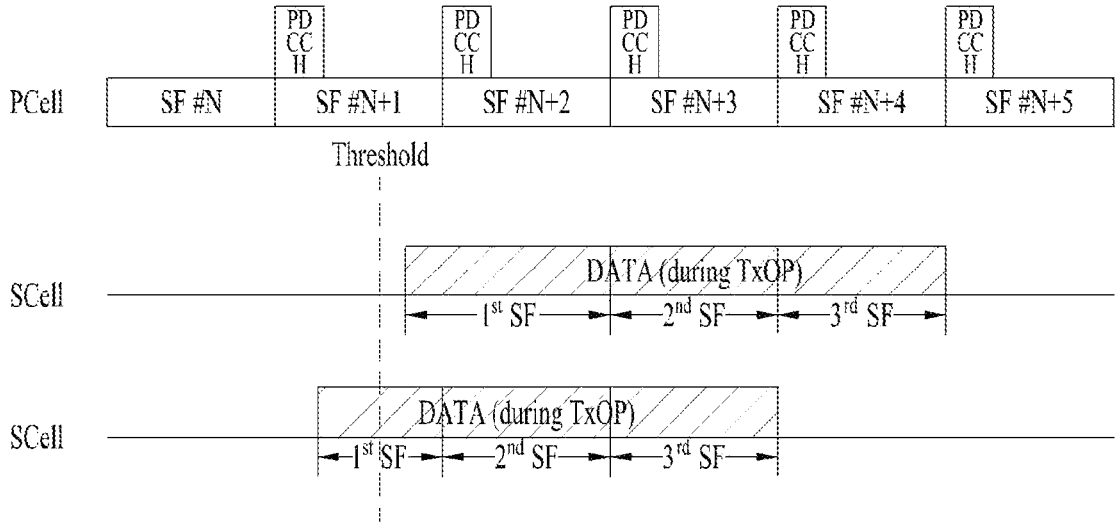
FIG. 22 is a view illustrating a method for determining an SF length based on a threshold.

FIG. 22 is a view illustrating a method for determining an SF length based on a threshold.

If the first SF includes as many OFDM symbols as or fewer OFDM symbols than a threshold, the first SF may be concatenated with the next SF into one SF. Referring to FIG. 22, it may be noted that a TxOP starts in a latter part of SF #N+1 in a first SCell. That is, if the length of the TxOP in SF #N+1 with respect to an SF boundary of a PCell is equal to or smaller than a threshold, the TxOP of SF #N+1 and the TxOP of SF #N+2 in the SCell may be concatenated into the first SF.

Or if the first SF includes more OFDM symbols than the threshold, the first SF may be configured to be independent of the next SF. Referring to FIG. 22, it may be noted that a TxOP starts in a former part of SF #N+1 in a second SCell. That is, if the length of the TxOP in SF #N+1 with respect to an SF boundary of the PCell is larger than the threshold, the first SF of the TxOP of SF #N+1 may be configured to be independent of the TxOP of SF #N+2.

That is, if the SCell is determined to be idle in SF #N+1, the first SF of the TxOP may be configured to be an independent pSF, or an over SF (oSF) produced by concatenating the SF with the next SF, depending on whether the number of OFDM symbols in the TxOP is equal to or larger than the threshold.

In another aspect of the embodiment, as is the case with a special SF configuration that does not allow PDSCH transmission (i.e., special SF configurations 0 and 5 in a normal CP case, and special SF configurations 0 and 4 in an extended CP case) in the current LTE/LTE-A system, the first SF may be configured with three or fewer OFDM symbols. In this case, the first SF may be concatenated with the next SF into one SF.

4.2.5 TBS Determination Method-3

When the first SF is configured with more OFDM symbols than a threshold in Section 4.2.4, a TBS may be calculated in the methods described in Section 4.2.1 and Section 4.2.2. However, if the first SF is configured to be an oSF by concatenating as many OFDM symbols as or fewer OFDM symbols than the threshold with the next SF, $N_{PRB}$ may be determined by the following [Equation 4].

$$N_{PRB} = \max\left\{\left\lfloor N'_{PRB} \times \frac{T+k}{T} \right\rfloor, 1\right\} \quad \text{[Equation 4]}$$

In [Equation 4], k or (T+k) may be transmitted to a UE in DCI of SF #N+2 by CCS.

However, if a normal CP is used, the threshold is 3 OFDM symbols, and k is 3, $N_{PRB}$ is calculated by $N_{PRB}=\max\{\lfloor N'_{PRB}\times 17/14\rfloor, 1\}$ where if $N'_{PRB}=100$, $N_{PRB}=121$ larger than a maximum value of $N_{PRB}$ as defined in the current LTE/LTE-A system. To prevent this, $N_{PRB}$ may be determined by [Equation 5].

$$N_{PRB} = \min\left\{\max\left\{\left\lfloor N'_{PRB} \times \frac{T+k}{T} \right\rfloor, 1\right\}, Z\right\} \quad \text{[Equation 5]}$$

In [Equation 5], Z is a maximum available number of PRBs in a system BandWidth (BW) given to the SCell. For example, Z may be set to 110.

If $N_{PRB}$ calculated by [Equation 4] is larger than Z, $N_{PRB}$ may be calculated in the following manner, instead of the method described by [Equation 5]. For example, if a TBS determined by $I_{TBS}$ and $N_{PRB}$ (refer to the LTE standard TS 36.213, Table 7.1.7.2.1-1) is defined as $TBS(I_{TBS}, N_{PRB})$, an actual TBS may be calculated by [Equation 6].

$$TBS(I_{TBS}, N_{PRB}) = \left\lfloor TBS(I_{TBS}, N'_{PRB}) \times \frac{T+k}{T} \right\rfloor \quad \text{[Equation 6]}$$

In another aspect of the embodiment, the UE may be configured not to expect $N_{PRB}$ calculated by [Equation 4] larger than Z. That is, the UE may ignore or discard DCI that configures $N_{PRB}$ larger than Z.

4.2.6 RS Configuration Method-2

When one SF is configured by concatenating the first SF of a TxOP with the next SF in Section 4.2.4, CRSs may be transmitted not in OFDM symbols concatenated to the next SF, but in the full OFDM symbols of the next SF. The UE may perform channel estimation using the CRSs.

Or, DM-RSs may not be transmitted in the OFDM symbols concatenated to the next SF, and the UE may perform data demodulation using DM-RSs in the next full SF.

For example, referring to FIG. 22, CRSs and/or DM-RSs are allocated not to OFDM symbols corresponding to SF #N+1 in the first SF of the TxOP, but to an area corresponding to SF #N+2.

In another aspect of the embodiment, the UE may configure CRSs and/or DM-RSs for the OFDM symbols concatenated to the next SF by copying a part (e.g., a former or latter part) of the following full SF.

4.3 Method for Fixing Length of First SF in TxOP

If a reservation signal and data are transmitted in an SCell in the methods described in Section 4.2, an eNB managing a PCell does not know at the starting time of SF #N+1 when data transmission actually starts in the SCell. Accordingly, the eNB preferably determines a TBS and an MCS for each available SF configuration unit in advance, and prepares for data transmission suitable for each unit.

If data transmission is possible at an OFDM symbol boundary, a total of 14 lengths ranging from 1 OFDM symbol to 14 OFDM symbols are available as the length of the first SF of a TxOP. Therefore, at the start of SN #N+1, the eNB should prepare 14 different data having different TBSs and MCSs for 14 starting points, thereby increasing the configuration and scheduling complexity of the SCell.

Now, a description will be given of a transmission method for reducing complexity in relation to an SCell, and a related TBS determination method and RS transmission method.

In Section 4.2, the TBS of the first SF of a TxOP in an SCell is adjusted for alignment with an SF boundary of a PCell, starting from SF #N+2. In contrast, an embodiment of the present disclosure as described below is about methods for reducing the complexity of an SCell by fixing the length of the first SF of a TxOP in the SCell to the length (e.g., 1 ms) of an SF in a PCell.

For example, if it is possible to transmit data in the SCell in alignment with a slot boundary of the PCell, even though transmission of the first SF starts in an odd-numbered slot of the PCell, an SF may be configured to be as long as the legacy SF and the last SF of the TxOP may be transmitted during one slot (i.e., 0.5 ms).

As a consequence, there is no need for preconfiguring the first SF in a plurality of units in the PCell at the starting time of SF #N+1, and the last SF of the TxOP has only to be configured in a variable length, thereby reducing the complexity of the SCell.

Figure 23:
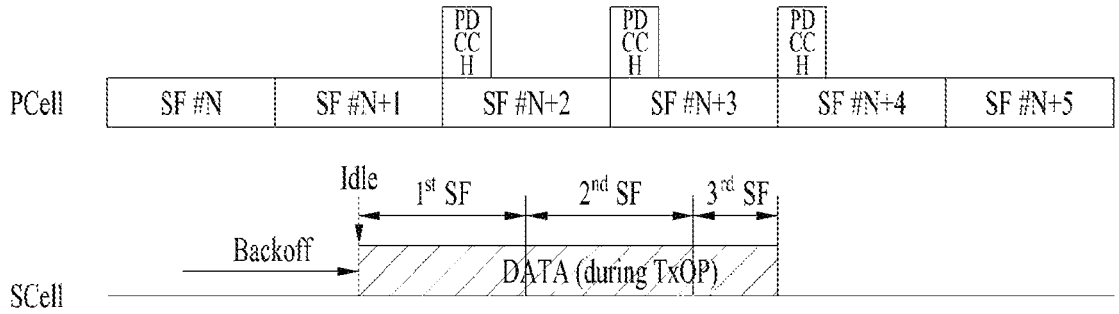
FIG. 23 is a view illustrating a method for fixing the length of the first SF of a Transmission Opportunity Period (TxOP)

FIG. 23 is a view illustrating a method for fixing the length of the first SF of a TxOP.

Referring to FIG. 23, an SCell is determined to be idle in SF #N+1, and a TxOP is allocated, starting from SF #N+1. The last SF (i.e., the third SF) of the TxOP may be configured to be in a variable length, for alignment with an SF boundary of a PCell.

If the last SF of the TxOP is aligned with a boundary of the PCell, a processing delay may be reduced on the part of the eNB, if SF #N+4 is configured as a UL SF. For example, UL transmission may be performed immediately in SF #N+4. In addition, in the case of a non-TDD configuration, the freedom of DL/UL configuration may be increased.

4.3.1 TBS Determination Method-4

Since the first SF of a TxOP is configured to be of the same length as an SF in a PCell, a TBS may be set to be equal to that of the PCell. However, considering that the last SF of the TxOP has a variable length, the eNB may configure a TBS using the TBS determination method described in Section 4.2.1 and/or Section 4.2.2, and the UE may receive and decode data by determining a TBS based on DCI received from the eNB.

4.3.2 Special SF Configuration

The last SF of a TxOP may be configured to include only as many OFDM symbols as defined in a DwPTS configuration being a specific SF configuration (refer to [Table 1]).

Or, it may be restricted that the SF should be configured only with units of a specific OFDM symbol (e.g., an even number of OFDM symbols). In this case, the actual length of the last SF may not match a regulated transmission unit for the last SF. For example, although it is regulated that the last SF is transmitted only in units of a slot, the actual number of OFDM symbols in the last SF may be only 3. In this case, it may be defined that the last SF is not configured.

That is, the last SF may be configured with the largest of defined transmission units for the last SF, shorter than the actual length of the last SF. For example, if the last SF is configured with as many OFDM symbols as defined by a legacy DwPTS configuration, the unit of the last SF defined for the case of a normal CP is 3, 7, 9, 10, 11, 12, or 14 OFDM symbols. If the actual length of the last SF is 13 OFDM symbols, the last SF may be configured only with 12 OFDM symbols. That is, the last SF may be configured with the largest of SF units smaller than a defined size.

4.3.3 DM-RS Configuration Method

Similarly to the description of Section 4.2.3, if the last SF is configured to be shorter than the SF length (i.e., 1 ms) of a PCell, for example, if the last SF is configured with only one slot, DM-RSs enough for data demodulation may not be ensured.

Figure 24:
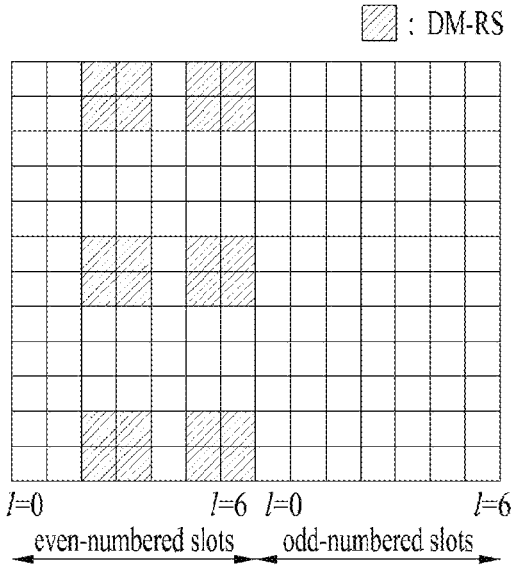
FIG. 24 is a view illustrating a method for allocating Demodulation Reference Signals (DM-RSs), if the last SF of a TxOP is configured variably.

To avert the problem, if the length of the last SF is smaller than Q, it may be configured that DM-RSs are transmitted in the pattern illustrated in FIG. 24. FIG. 24 is a view illustrating a method for allocating DM-RSs, when the last SF of a TxOP is configured variably.

The DM-RS configuration method illustrated in FIG. 24 is applied for a special SF configuration. For example, Q may be set to one slot. Q may be configured for the UE by higher layer signaling or physical layer signaling.

4.3.4 Method for Configuring Last SF Based on Threshold

Figure 25:
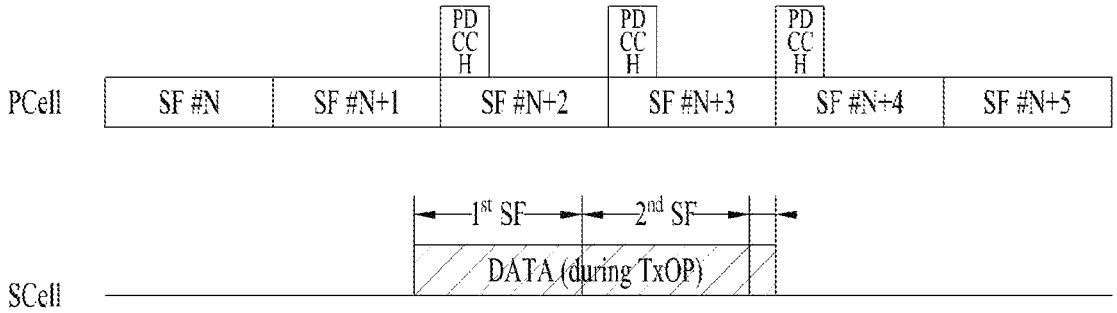
FIG. 25 is a view illustrating a case of fixing the length of the first SF of a TxOP.

If an SCell operates in alignment with a symbol boundary of a PCell as described in Section 4.2.4, the last SF of a TxOP may be configured only with one OFDM symbol in an extreme case. FIG. 25 is a view illustrating a case of fixing the length of the first SF of a TxOP. Referring to FIG. 25, it may be noted that when the size M of a TxOP is 3, the length of the last third SF of the TxOP is one OFDM symbol.

Also in this case, an SF may be configured and a TBS may be determined in the methods described in Section 4.2.4 and Section 4.2.5. For example, the last third SF and the previous second SF may be concatenated into one SF.

However, if the last SF is configured to be longer than the legacy SF length, the resulting decoding delay may affect an HARQ-ACK process. Therefore, it may not be reasonable to set the length of the last SF to be larger than the legacy SF length. In this context, the length of the first SF may be set variably, rather than the last SF is set to be longer than the legacy SF length. As a consequence, the length of the last SF may not be smaller than a specific value.

Figure 26:
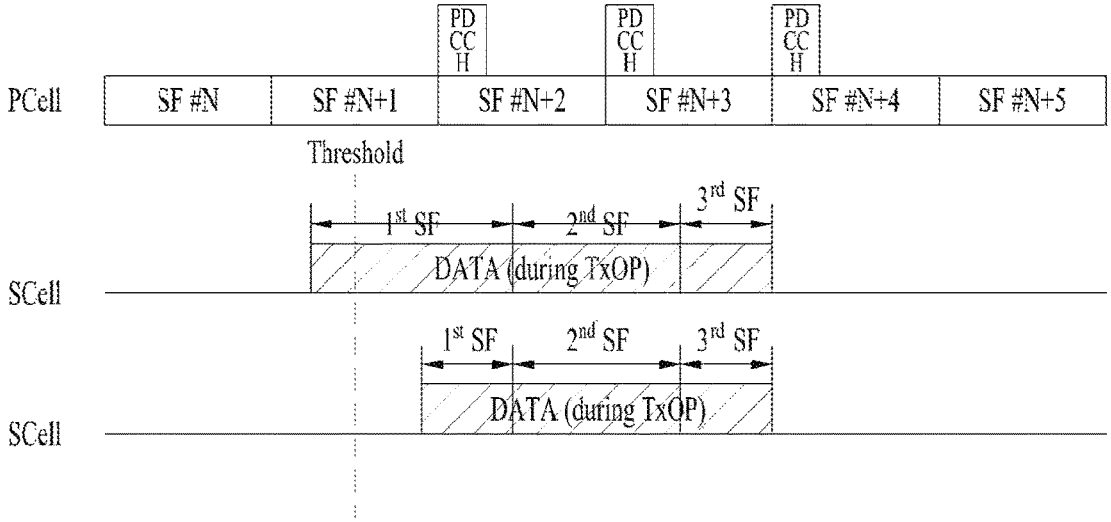
FIG. 26 is a view illustrating one of methods for configuring the first and last SFs of a TxOP based on a threshold.

FIG. 26 is a view illustrating one of methods for configuring the first and last SFs of a TxOP based on a threshold.

Referring to FIG. 26, a slot boundary of a PCell is set as a threshold. In the case where an SCell is determined to be idle in SF #N+1, if the first SF of a TxOP starts before the threshold, the length of the first SF may be set to the legacy SF length. If the first SF of the TxOP starts after the threshold, the length of the first SF may be set to one slot.

This configuration may always maintain the length of the last SF to be larger than one slot. In FIG. 26, the first SF of a TxOP starts before a threshold in a first SCell and thus is configured to be 1 ms long. The last SF of the TxOP may be configured to be 1 ms-a (a=<0.5 ms) long.

In a second SCell, the first SF of a TxOP starts after the threshold. Thus, the first SF may be configured to include one slot (i.e., 0.5 ms). The second SF of the TxOP may be 1 ms long as in a PCell, and a length equal to or larger than 0.5 ms may be ensured for the third SF of the TxOP because the first SF is 0.5 ms long. That is, the length of the last SF may be set to 0.5 ms+a (a=<0.5 ms).

The threshold may be allocated semi-statically by higher layer signaling or dynamically by physical layer signaling. The TBSs of the first SF and the last SF may also be determined in the method described in Section 4.2.1, Section 4.2.2, and/or Section 4.3.2.

DM-RSs may be determined for the first SF and the last SF in the method proposed in Section 4.2.3.

In the afore-described Section 4.3.1 to Section 4.3.3, the eNB may indicate the number of OFDM symbols in the last SF to the UE in SF #N+4 in the PCell by CCS. Or each UE may calculate the number of OFDM symbols in the last SF of the TxOP based on the starting time of the first SF and the threshold in the above-described rule.

4.4 TxOP Configuration Method-1

4.4.1 Method for Determining Starting Time of TxOP Based on Threshold

As described regarding the transmission starting time of data in an SCell from an eNB in Section 4.1, data may be transmitted by aligning an SF boundary of the SCell with an SF boundary of a PCell. Or data may be transmitted in alignment with a slot boundary or OFDM symbol boundary of the PCell instead of an SF boundary of the PCell, as described before in Section 4.2 and/or Section 4.3.

Now, a description will be given of a method for transmitting a reservation signal based on a threshold, and a method for determining a starting time of data transmission.

Figure 27:
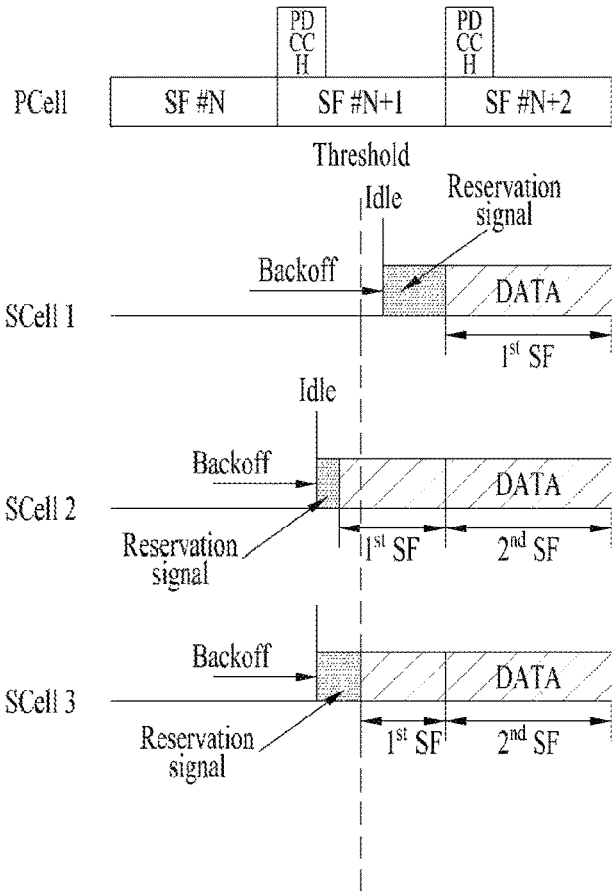
FIG. 27 is a view illustrating another of the methods for transmitting a reservation signal based on a threshold.

FIG. 27 is a view illustrating another of the methods for transmitting a reservation signal based on a threshold.

In FIG. 27, it is assumed that a PCell and an SCell are configured as described before with reference to FIG. 12. A threshold for transmitting a reservation signal and/or determining a starting time of data transmission may be a predetermined fixed value in the system, or may be allocated semi-statically by higher layer signaling or dynamically by physical layer signaling.

The threshold may be defined as t μs after (or before) an SF boundary of the PCell, or as an $m^{th}$ OFDM symbol boundary. If a backoff operation or a CS operation is completed earlier than the threshold, the eNB may configure an SF in a unit shorter than one SF (i.e., 1 ms) and start data transmission in the configured SF, after transmitting a reservation signal in the SCell (or without transmitting the reservation signal).

It may be configured that actual data transmission starts at the threshold (refer to SCell 3 in FIG. 27) or at a predetermined time point (e.g., an OFDM symbol boundary) earlier than the threshold (refer to SCell 2 in FIG. 27). On the other hand, if the backoff operation or the CS operation is completed after the threshold, a reservation signal may be transmitted until the next SF boundary, and then data transmission may start (refer to SCell 1 in FIG. 27).

Referring to FIG. 27 again, if the eNB is to transmit data in an SCell of an unlicensed band, the eNB performs a backoff operation and a CS operation in the SCell. If determining that the SCell is idle in SF #N+1, the eNB may configure a TxOP and transmit data in the TxOP.

Notably, the eNB may align a data transmission time (i.e., the starting time of the first SF of the TxOP) with an SF boundary, OFDM symbol boundary, or slot boundary of the PCell. While it is assumed that the threshold is set as a slot boundary in FIG. 27, the threshold may vary according to a channel environment.

In SCell 1, since the eNB has completed the backoff operation and the CS operation at a time point after the threshold, the eNB may align the starting time of the first SF of the TxOP with a boundary of SF #N+2 in the PCell.

In SCell 2, since the eNB has completed the backoff operation and the CS operation at a time point before the threshold, the eNB may align the starting time of the first SF of the TxOP with a slot boundary or OFDM symbol boundary of the PCell. It is assumed that the starting time of the first SF is aligned with a slot boundary of the PCell in SCell 2.

In SCell 3, since the eNB has completed the backoff operation and the CS operation at the threshold, the eNB may align the starting time of the first SF of the TxOP with a slot boundary or OFDM symbol boundary of the PCell. It is assumed that the starting time of the first SF is aligned with a slot boundary of the PCell in SCell 3.

Or if the backoff operation or the CS operation is completed after the threshold, the eNB may perform the backoff operation or the CS operation again without transmitting a reservation signal in the SCell, start data transmission at the next SF boundary without transmitting the reservation signal, or perform the backoff operation or the CS operation, starting at the next SF boundary without transmitting the reservation signal.

4.4.2 Method for Setting Starting Time of TxOP Based on Code Rate

A method for determining the starting time of a TxOP using a time-axis threshold has been described above in Section 4.4.1. Now, a description will be given of methods for determining the starting time of a TxOP based on a code rate.

For example, a threshold Y may be set for a code rate. If an SF may be configured to be a smaller unit than one 1-ms SF unit, the eNB may start data transmission only when a code rate is equal to or lower than Y. This is because if data is transmitted at a code rate higher than Y, it may occur that the eNB may not ensure the reliability of transmission data.

Or the eNB may transmit only data corresponding to a maximum TBS with a code rate equal to or lower than Y. As described before in Section 4.4.1, the eNB may transmit a reservation signal between an ending time of a CS or backoff operation and a data transmission time.

If the code rate is higher than the threshold Y, the eNB may transmit a reservation signal until the next SF boundary, perform the CS operation again, starting from the next SF boundary, while giving up data transmission, or perform data transmission.

The threshold Y may be preset in the system or configured by physical layer signaling or higher layer signaling.

If an SF shorter than 1 ms is configured in Section 4.4.1 or Section 4.4.2, a TBS may be determined according to the method proposed in Section 4.2.1 or Section 4.2.2. Or a code rate may be determined according to a puncturing or rate matching method after a TBS is determined in Section 4.4.1 or Section 4.4.2.

4.4.3 HARQ Process Configuration

If the first SF of a TxOP is configured with as many OFDM symbols as or fewer OFDM symbols than a threshold, the OFDM symbols and the next SF may be concatenated into one SF, as described in Section 4.2.4. Or if the first SF is configured with more OFDM symbols than the threshold, the OFDM symbols may be configured as an independent SF.

Now, an HARQ-ACK configuration will be proposed. If the first SF is configured by concatenating as many OFDM symbols as or fewer OFDM symbols than a threshold to the next SF, the UE may regard the first SF as one HARQ process. On the other hand, if the first SF is configured with more OFDM symbols than the threshold, the UE may consider that an HARQ process has been configured for each independent SF. That is, the UE may consider that separate (i.e., two) HARQ processes have been configured for the first SF of a length shorter than 1 ms but larger than the threshold and the next second SF.

In another aspect of the embodiment, if the first SF is configured to be shorter than 1 ms, an HARQ-ACK for the first SF may be bundled with an HARQ-ACK for the next SF (or the previous SF), that is, a full 1-ms SF.

4.4.4 Special SF Configuration

If a short SF which is not defined in the DwPTS configurations described in Section 3 is configured and transmitted, the eNB may not give up data transmission in the SF and transmit only data without allocating RSs such as CRSs or DM-RSs.

4.5 TxOP Configuration Method 4.5.1 Method for Configuring TxOP in Case of Aligning SF Boundary of SCell with SF Boundary of PCell When an SCell is determined to be idle, the starting time of data transmission may be aligned with an SF boundary of a PCell, as described in Section 4.1.2 with reference to FIG. 19. The eNB may require at least Y1 ms as a processing time for DCI configuration in performing CCS in the PCell (or the SCell).

Figure 28:
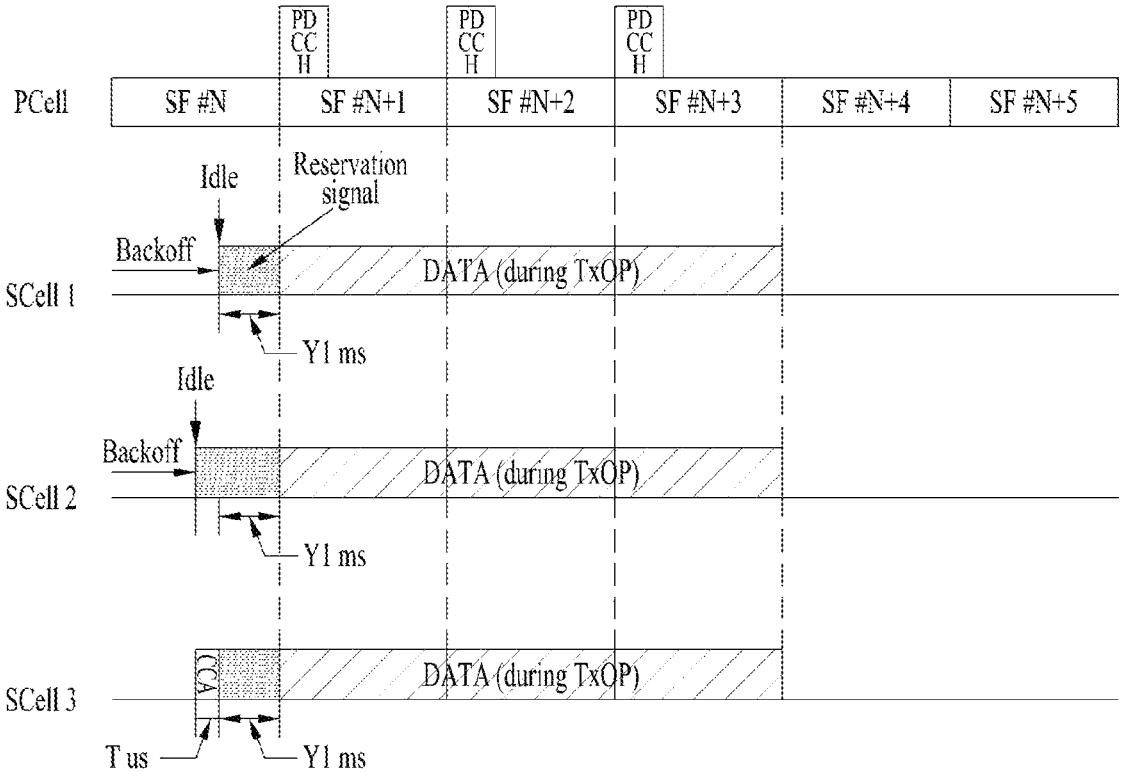
FIG. 28 is a view illustrating a method for transmitting a reservation signal.
Figure 29:
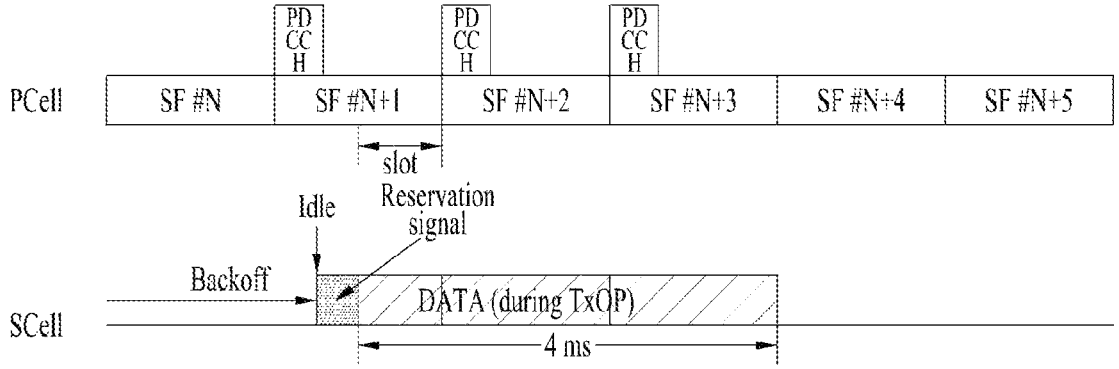
FIG. 29 is a view illustrating a TxOP configuration, if the first SF of a TxOP is aligned with a slot boundary.

FIG. 28 is a view illustrating a method for transmitting a reservation signal.

Hereinbelow, a method for ensuing Y1 ms (or an Y2 OFDM symbol time) for configuring DCI while an SF boundary of an SCell is aligned with an SF boundary of a PCell as described in Section 4.1.2 and the alignment is maintained (e.g., within a time error of 30.26 μs in the LTE-A system) is proposed.

In FIG. 28, only when a backoff operation is completed Y1 ms earlier than the starting time of SF #N+1 or a condition for stating data transmission in a TxOP is satisfied as in SCell 1 or SCell 2, the eNB may start data transmission in SF #N+1.

For example, if the eNB performs CCA only during Tμs without backoff as in SCell 3 in FIG. 28, the eNB may perform CCA during T μs Y1 ms before each SF boundary.

If the SCell is determined to be idle in a CCA period of SF #N, the eNB may transmit a reservation signal during Y1 ms and start data transmission in SF #N+1. If the SCell is busy, the eNB may determine again whether the SCell is busy or idle in a CCA period of SN #N+1. If Y1 ms is shorter than two OFDM symbols, the reservation signal may be configured to include DM-RSs.

In another aspect of the embodiment, the eNB may transmit a reservation signal during Y1 ms to align a boundary of the SCell with an SF boundary of the PCell.

4.5.2 Method for Configuring TxOP in Case of Alignment with Slot Boundary of PCell Methods for ending a TxOP at an SF boundary have been described in Section 4.2 with reference to FIG. 20. However, the eNB may not end the TxOP at an SF boundary to match a total time during which the TxOP is configured (i.e., M=3 SFs). If a maximum length of consecutive transmissions in an unlicensed band is limited (e.g., to 4 ms) and the TxOP ends at an SF boundary, short of the maximum length, radio resources may be inefficiently utilized.

If the last SF of the TxOP is a pSF shorter than 1 ms, the TBS determination methods and the RS transmission methods described in Section 4.2.1 to Section 4.2.4 are applicable to the pSF.

If the starting time of a TxOP is set to a point other than an SF boundary according to the ending time of CS (i.e., CCA) (e.g., on a slot basis or an OFDM symbol basis (one of the starting times of 14 OFDM symbols) as in the proposed methods of Section 4.2 and Section 4.3, that is, if the length of the first SF of the TxOP is allowed to be variable in every TxOP, signaling of an RS configuration for the first SF and a transmission length of the first SF may become complex, which may make actual UE implementation difficult.

On the other hand, in embodiments in which an eNB transmits data by aligning the start and end of a TxOP in an SCell with SF boundaries of a PCell, if a specific eNB is to configure consecutive TxOPs, one SF may always be wasted for performing CCA and transmitting a reservation signal between TxOPs.

Figure 30:
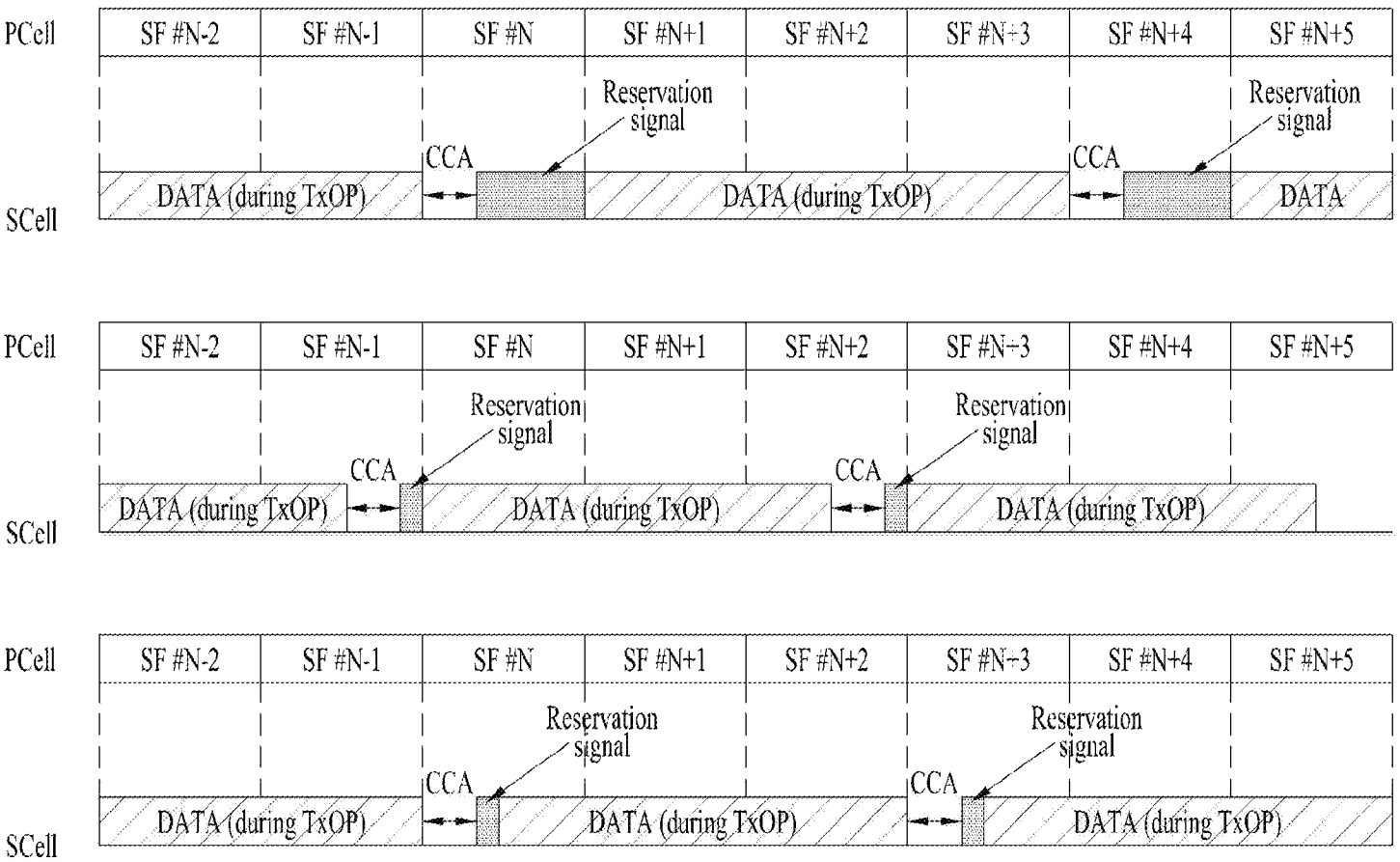
FIG. 30 is a view illustrating one of methods for configuring consecutive TxOPs.

FIG. 30 is a view illustrating one of methods for configuring consecutive TxOPs.

FIG. 30(a) illustrates a method for configuring consecutive TxOPs, when a boundary of an SCell is aligned with an SF boundary of a PCell as described in Section 4.1. Referring to FIG. 30(a), when an eNB ends the first TxOP in SF #N−1 and then immediately wants to start the next TxOP, the eNB should wait until the next SF boundary even though CCS is completed in the middle of SF #N.

That is, the eNB should transmit a reservation signal instead of data from the ending time of CCA to the starting time of SF #N+1. A shortcoming with this scheme is that if the length of a TxOP for data transmission is set to up to 3 ms, the resources of one SF out of four SFs may not be used for data transmission, if consecutive TxOPs are to be configured.

To solve the problem, a TxOP configuration illustrated in FIG. 30(b) may be considered. Referring to FIG. 30(b), the eNB may configure the ending time of the last SF of a TxOP to be earlier than an SF boundary of a PCell, and perform CCA during a timing gap lasting until the next SF boundary. If the CCA operation (e.g., initial CCA and/or ECCA) is completed during the timing gap, the eNB may configure a TxOP to start at the next SF boundary.

If there is a TxOP ending in SF #N−1, the eNB may end the TxOP before an SF boundary at which SF #N starts, to perform a backoff operation and/or a CCA operation for configuring the next TxOP. If the CCA operation ends between the ending time of the TxOP and the starting time of SF #N, the eNB may transmit a reservation signal until before the starting time of SF #N, and then immediately configure a TxOP at the starting time of SF #N.

Compared to the TxOP configuration illustrated in FIG. 30(a), the TxOP configuration illustrated in FIG. 30(b) offers the benefit of a great decrease in a non-data transmission period between TxOPs. The SF structure illustrated in FIG. 30(b) is characterized in that the length of the last SF of a TxOP (or the last SF of a TxOP having a maximum available length) may be determined fixedly or semi-statically. The last SF may be shorter than a 1-ms full SF. That is, the last SF may be configured to be a pSF, and the TBS determination methods and the RS transmission methods described in Section 4.3.1 to Section 4.3.4 are applicable to the pSF.

While a timing gap is positioned in the last SF of each TxOP to configure consecutive TxOPs without SF waste in the TxOP configuration illustrated in FIG. 30(b), the timing gap may be positioned in the first SF of each TxOP as illustrated in FIG. 30(c).

In FIG. 30(c), the length of the first SF of a TxOP may be determined fixedly or semi-statically. For example, the first SF may be shorter than a 1-ms full SF. That is, the first SF may be configured to be a pSF, and the TBS determination methods and the RS transmission methods described in Section 4.2.1 to Section 4.2.6 are applicable to the pSF.

In another aspect of the embodiment, the methods proposed in FIG. 30 may be easily extended to an LBT method in which if a channel is determined to be idle at a predetermined time point after CCA, a TxOP starts immediately without transmission of a reservation signal.

4.6 TBS Configuration Method-5

The eNB preferably prepares different TBSs according to pSF lengths for the case of transmission of a pSF shorter than the legacy SF length, 1 ms, as in SF #N+1 in FIG. 20 described in Section 4.2. That is, the eNB managing a PCell or an SCell does not know at the starting time of SF #N+1 when data transmission will start in the SCell.

Accordingly, the eNB should determine a TBS and an MCS for each available pSF configuration unit in advance, and prepare for data transmission suitable for each unit. If data transmission is possible at an OFDM symbol boundary, a total of 14 lengths ranging from 1 OFDM symbol to 14 OFDM symbols are available as the length of the first SF in a TxOP. Therefore, at the starting time of SN #N+1, the eNB should prepare 14 different data having different TBSs and MCSs for 14 starting points, thereby increasing the configuration complexity of the SCell.

A description will be given below of a method for allocating a fixed TBS to a pSF, even though the pSF shorter than the legacy SF length (e.g., 1 ms) is configured, in order to avert the above problem.

4.6.1 Change of Received RB Size of PDSCH According to Variable SF Length

For example, in the case where 5 RBs are scheduled on the assumption of 10 symbols (10×5), if an SF length is 5 symbols, the UE may receive a signal by extending the RBs to 10 RBs for 5 symbols (5×10).

On the contrary, in the case where 10 RBs are scheduled on the assumption of 5 symbols, if an SF length is 10 symbols, the UE may receive a signal only in 5 RBs out of allocated 10 RBs.

Because the total number of RBs available in the system is limited, a PDSCH may not be transmitted to some UE. In this case, buffer handling for the UE failing in PDSCH reception may be performed using an NDI or the like. Considering this UE operation, only initial transmission may be allowed in a pSF.

4.6.2 TBS Based on Minimum SF Length and Assumption of Repetition of the TBS

For example, a TBS may be determined on the assumption that a minimum SF length is 3 symbols. If an SF length is determined to be 6 symbols, the eNB may transmit the same TB twice. However, a repetition number may not necessarily be limited to an integer multiple. For example, if 5 symbols are secured, a TB may be configured to be repeated (1+⅔) times.

Redundancy versions may be cyclically applied to the repeated TBs in a predefined pattern (e.g., 0→2→3→1). As the eNB transmits the same TB repeatedly, a data throughput is reduced but robust transmission is possible. Therefore, a retransmission number may be reduced.

4.7 Method for Restricting Starting Time of TxOP

To increase the efficiency of radio resource utilization in the LTE system operating in an unlicensed band as illustrated in FIG. 20 as described in Section 4.2, a TxOP for data transmission may start at a time point other than an SF boundary.

However, if a TxOP is allowed to start in each OFDM symbol, the implementation complexity of an eNB and a UE may be increased. This is because the eNB should prepare a plurality of sets of TBS and RE mappings in advance and the complexity of detecting the starting time of a TxOP may be increased in the UE.

Therefore, in another embodiment of the present disclosure, the starting time of a TxOP may be confined to a specific OFDM symbol. The following description is given on the assumption that the starting time of a TxOP is limited to the first or fourth OFDM symbol (i.e., a part of OFDM symbols with CRS port 0) of an SF. However, this constraint may be extended to a slot unit (e.g., a boundary of the first or second slot).

In general, the eNB determines a TBS at least hundreds of μsec earlier in order to transmit data in SF #N, and indicates the determined TBS by higher layer signaling to transmit data corresponding to the TBS. If a TxOP starts at an SF boundary of the PCell, the eNB may transmit data in 14 OFDM symbols. Or if the TxOP starts in the fourth OFDM symbol, the eNB may transmit data in 10 OFDM symbols.

Although the eNB may not predict the starting time of a TxOP preliminarily hundreds of μs earlier during an LBT operation, if the eNB prepares for TBSs and so on for two starting time points, eNB implementation complexity may be increased significantly.

To solve the problem, the eNB may prepare only one TBS irrespective of the starting time of the first SF of a TxOP. A method for scaling a PRB size in determining a TBS for transmission in 10 OFDM symbols may be determined according to Section 4.2.1 or Section 4.2.2.

If the UE receives an SF including a partial TTI (i.e., a pSF), the UE may determine a TBS based on the number of transmission OFDM symbols and the number of OFDM symbols preset independently between the eNB and the UE.

From the perspective of the eNB, the eNB may assume a full SF (i.e., 14 OFDM symbols) in pSF transmission or assume that a pSF is configured with fewer OFDM symbols than a predetermined number of OFDM symbols, that is, 14 OFDM symbols.

If it is regulated that when the eNB transmits a pSF, the eNB assumes transmission of a full SF all the time, the UE may decode the pSF on the assumption of receiving a full SF.

Further, if it is regulated that when the eNB transmits a pSF, the eNB assumes transmission of a predetermined smaller number of OFDM symbols, the UE may decode the pSF on the assumption of receiving an SF including the predetermined smaller number of OFDM symbols.

In this case, as the eNB configures an SF configuration unit for the UE when transmitting the pSF, the UE may decode the pSF based on the configured SF configuration unit.

Now, a description will be given below of methods for determining a TBS for a configured pSF according to this rule.

4.7.1 TBS Configuration in Predetermined Rule

The eNB may configure an SF with a fixed number of OFDM symbols (e.g., 10 OFDM symbols) as the first SF of a TxOP, and determine a TBS according to the fixed number of OFDM symbols. Regarding this, the PRB size scaling method described in Section 4.2.1 or Section 4.2.2 may be referred to.

The UE may determine that a corresponding SF is the first SF of the TxOP by receiving a reservation signal or an indication by physical layer signaling or higher layer signaling. That is, the UE may consider that an assumed TBS of 10 OFDM symbols has been applied to the first SF.

In this case, since the number of OFDM symbols in the first SF being a pSF is system-determined, there is no need for additional signaling of the TBS or the number of OFDM symbols.

4.7.2 TBS Configuration by Signaling

The eNB may configure a variable allocation of 14 OFDM symbols or 10 OFDM symbols all the time for the first SF of a TxOP. For example, the length of a pSF may be configured semi-statically by higher layer signal or dynamically by physical layer signaling (i.e., DCI). For example, the eNB may configure a TBS for a pSF by differentiating a scrambling sequence, a CRS mask, and/or a search space in DCI or adding a new field to a DCI format.

The first SF of a TxOP may be configured on the assumption that its TBS is 10 OFDM symbols by higher layer signaling. In this case, upon recognizing that a corresponding SF is the first SF of the TxOP by a reservation signal or an indication received by higher layer signaling or physical layer signaling, the UE may consider that the assumed TBS of 10 OFDM symbols is applied to the SF.

Configuring the number of OFDM symbols in a pSF by dynamic signaling (i.e., physical layer signaling, DCI) will be described as another example. In the case where a 1-bit field of a physical layer signal, DCI is used to indicate the number of OFDM symbols, if the field is activated in the DCI, the UE may determine that an SF carrying the DCI includes 10 OFDM symbols. Thus, the UE may derive the TBS on the assumption of 10 OFDM symbols in the SF carrying the DCI. On the contrary, if the field is deactivated in the DCI, the UE may derive the TBS on the assumption that the SF carrying the DCI includes 14 OFDM symbols.

Accordingly, the UE may decode data transmitted in the pSF based on the derived TBS.

While Section 4.7 deals with a case in which the first SF of a TxOP is a pSF, it is applicable in the same manner to a case in which the last SF of a TxOP is a pSF.

4.8 Method for Transmitting and Receiving Data According to TxOP Configuration

Figure 31:
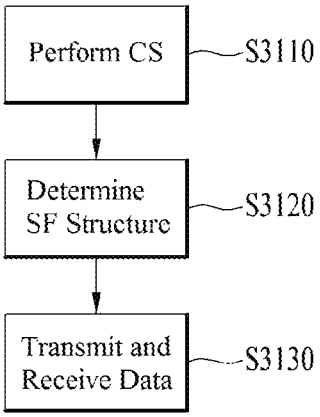
FIG. 31 is a flowchart illustrating one of methods for transmitting and receiving data according to a TxOP configuration.

FIG. 31 is a flowchart illustrating one of methods for transmitting and receiving data according to a TxOP configuration.

Methods for configuring a TxOP to transmit data in an SCell being an unlicensed band by an eNB have been described before in Sections 4.1 to 4.7. The eNB may perform a backoff operation and/or a CS operation to configure a TxOP in an SCell (S3110).

If a channel of the SCell is determined to be idle through the backoff operation and/or the CS operation, the eNB may determine an SF structure in order to configure a TxOP (S3120).

For example, if an SF of the SCell is aligned with an SF boundary of a PCell, an SF of the SCell is always configured in the same structure as an SF of the PCell, and thus the eNB and the UE may transmit and receive data according to an SF configuration defined for the PCell (for details, refer to Section 4.1).

To increase a data throughput in the PCell and the SCell, the first SF or the last SF of the TxOP may be configured to be a pSF shorter than an SF of the PCell (for details, refer to Section 4.2 to Section 4.7).

If the first SF and/or the last SF is configured to be a pSF, the eNB may indicate the number of OFDM symbol or a TBS for the pSF to the UE by higher layer signaling or physical layer signaling (not shown).

Or if a pSF is configured in the TxOP, the number of OFDM symbols in the pSF may be fixed in the system. In this case, the UE may receive data based on a TBS determined according to the fixed number of OFDM symbols.

Or if a pSF is configured in the TxOP, the eNB may fix the number of OFDM symbols available for the pSF to a predetermined value (e.g., 2 or 3) in order to reduce a processing delay. That is, a pSF may be configured with as many OFDM symbols as one of a plurality of numbers of OFDM symbols based on the number of OFDM symbols available for configuring a TxOP in an SF for which CS has been performed. In this case, the eNB may indicate the number of OFDM symbols in the configured pSF to the UE by higher layer signaling or physical layer signaling.

The eNB may transmit data in the configured TxOP and the UE may receive the data in the TxOP.

The foregoing embodiments of the present disclosure have been described in the context of DL. However, the embodiments of the present disclosure can be extended to UL as they are, except that DL RSs are replaced with UL RSs. For example, Section 4.1 and Section 4.4 may be extended as a backoff method for UL transmission, and Section 4.2 may be extended to a method for determining a TBS for a pSF on UL.

5. Apparatuses

Figure 32:
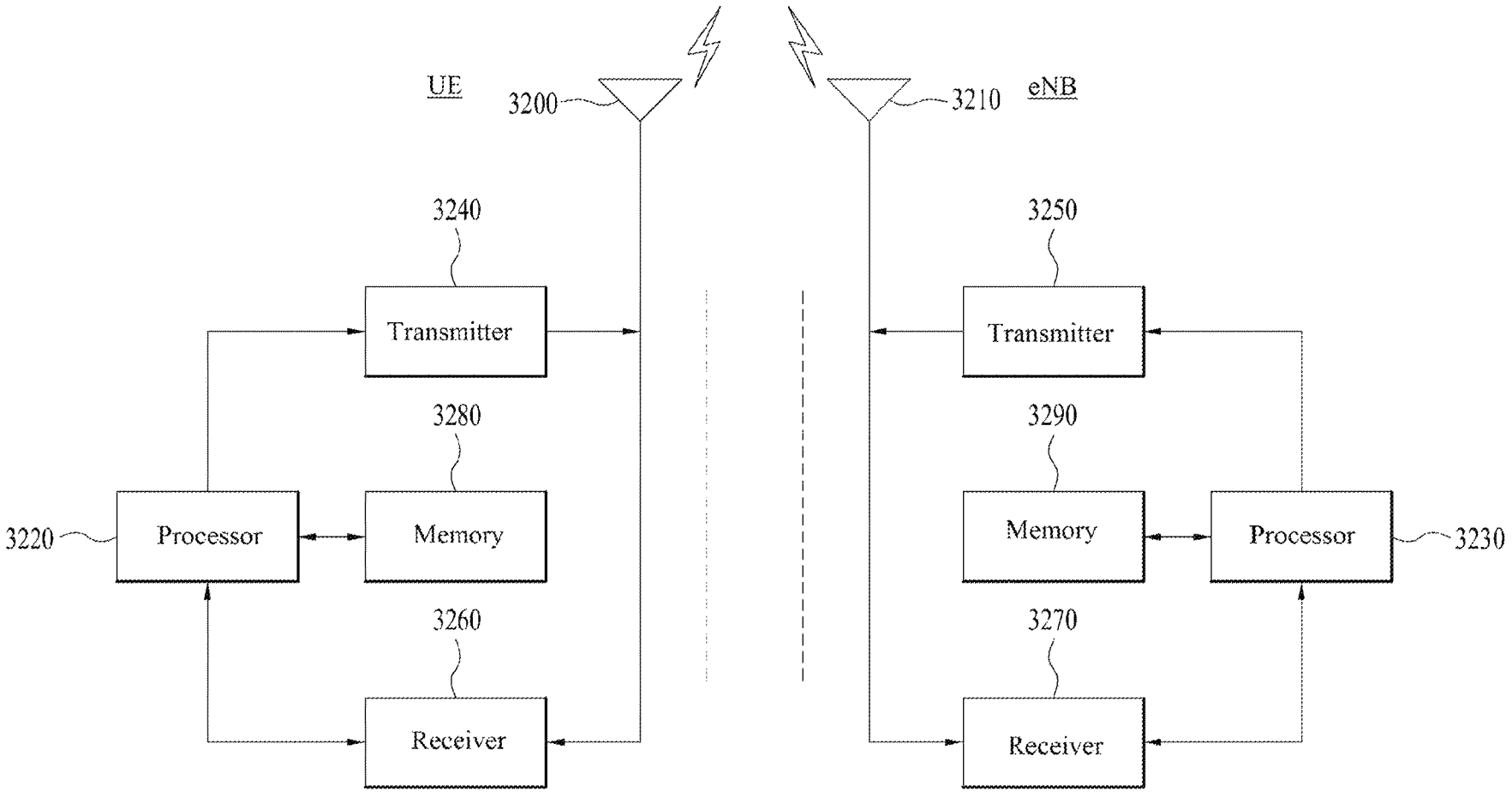
FIG. 32 is a block diagram of apparatuses for implementing the methods illustrated in FIGS. 1 to 31.

Apparatuses illustrated in FIG. 32 are means that can implement the methods described before with reference to FIGS. 1 to 31.

A UE may act as a transmission end on a UL and as a reception end on a DL. An eNB may act as a reception end on a UL and as a transmission end on a DL.

That is, each of the UE and the eNB may include a Transmitter (Tx) 3240 or 3250 and a Receiver (Rx) 3260 or 3270, for controlling transmission and reception of information, data, and/or messages, and an antenna 3200 or 3210 for transmitting and receiving information, data, and/or messages.

Each of the UE and the eNB may further include a processor 3220 or 3230 for implementing the afore-described embodiments of the present disclosure and a memory 3280 or 3290 for temporarily or permanently storing operations of the processor 3220 or 3230.

The embodiments of the present disclosure may be performed using the afore-described components and functions of a UE and an eNB. For example, the eNB may determine whether an SCell is idle by performing a backoff operation and a CS operation. If the SCell is idle, the eNB may configure a TxOP and transmit and receive data during the TxOP. The ENB may occupy the SCell by transmitting a reservation signal until before the configured TxOP. When configuring the TxOP, the eNB may configure a pSF and transmit information about the pSF to the UE. The pSF may be configured as the first and/or last SF of the TxOP. The UE may determine the TxOP configuration based on TxOP configuration information and/or the information about the pSF, and transmit and receive data in the TxOP. For various methods for configuring a TxOP, refer to the embodiments of the present disclosure described in Section 1 to Section 4.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 32 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 3280 or 3290 and executed by the processor 3220 or 3230. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method performed by a base station in a wireless access system, the method comprising:

[performing a carrier sensing procedure to determine whether] *determining that* a cell configured in an unlicensed band is idle*, based on a carrier sensing procedure*; and

*based on the cell being determined to be idle,* transmitting, in the cell, a downlink transmission on one or more consecutive time periods[after the cell is determined to be idle], wherein a number of symbols, on which at least part of the downlink transmission is mapped, included in a last time period among the one or more consecutive time periods is less than 14, wherein information indicating the number of the symbols is transmitted through downlink control information, wherein the last time period is included in a full time period configured as 14 symbols, and wherein remaining symbols included in the [last] *full* time period *including the last time period,* except for the symbols *on which at least part of the downlink transmission is mapped,* are unoccupied by transmissions in the unlicensed band.

2. The method of claim 1, wherein the number of the symbols satisfies one of a plurality of downlink pilot time slot (DwPTS) configurations.

3. The method of claim 1, wherein a $1^{st}$ time period among the one or more consecutive time periods starts from a predetermined symbol boundary within [the] *a* full time period *configured as 14 symbols*, and wherein a size of the $1^{st}$ time period is equal to or less than [the full time period] *14 symbols*.

4. The method of claim 3, wherein a starting time of the $1^{st}$ time period is aligned with a boundary of the full time period *related to the $1^{st}$ time period*, and wherein a symbol within a duration of the downlink transmission is aligned with a symbol of a cell configured in a licensed band.

5. The method of claim 2, wherein the DwPTS configurations are defined as in Table 1,

TABLE 1

| | Normal cyclic prefix in downlink | | |
|---|---|---|---|
| | | UpPTS | |
| Special subframe configuration | DwPTS | Normal cyclic prefix in uplink | Extended cyclic prefix in uplink |
| 0 | $6592 \cdot T_s$ | $2192 \cdot T_s$ | $2560 \cdot T_s$ |
| 1 | $19760 \cdot T_s$ | | |
| 2 | $21952 \cdot T_s$ | | |
| 3 | $24144 \cdot T_s$ | | |
| 4 | $26336 \cdot T_s$ | | |
| 5 | $6592 \cdot T_s$ | $4384 \cdot T_s$ | $5120 \cdot T_s$ |
| 6 | $19760 \cdot T_s$ | | |
| 7 | $21952 \cdot T_s$ | | |
| 8 | $24144 \cdot T_s$ | | |
| 9 | $13168 \cdot T_s$ | | |

wherein $T_s$ denotes a sampling time.

6. A method performed by a user equipment in a wireless access system, the method comprising:

receiving a downlink transmission in one or more consecutive time periods, wherein the downlink transmission is received in a cell configured in an unlicensed band[after the cell is determined to be idle based on a carrier sensing procedure for determining whether the cell is idle], wherein a number of symbols, on which at least part of the downlink transmission is mapped, included in a last time period among the one or more consecutive time periods is less than 14, wherein information indicating the number of the symbols is received through downlink control information, wherein the last time period is included in a full time period configured as 14 symbols, and wherein remaining symbols included in the [last] *full* time period *including the last time period,* except for the symbols *on which at least part of the downlink transmission is mapped,* are unoccupied by transmissions in the unlicensed band.

7. A user equipment configured to operate in a wireless access system, the user equipment comprising:

a memory; and at least one processor operatively coupled to the memory, wherein the at least one processor is configured to:

receive a downlink transmission in one or more consecutive time periods, wherein the downlink transmission is received in a cell configured in an unlicensed band[after the cell is determined to be idle based on a carrier sensing procedure for determining whether the cell is idle], wherein a number of symbols, on which at least part of the downlink transmission is mapped, included in a last time period among the one or more consecutive time periods is less than 14, wherein information indicating the number of the symbols is received through downlink control information, wherein the last time period is included in a full time period configured as 14 symbols, and wherein remaining symbols included in the [last] *full* time period *including the last time period,* except for the symbols *on which at least part of the downlink transmission is mapped,* are unoccupied by transmissions in the unlicensed band.

8. A base station configured to operate in a wireless access system, the base station comprising:

a memory; and at least one processor operatively coupled to the memory, wherein the at least one processor is configured to:

[perform a carrier sensing procedure to determine whether] *determine that* a cell configured in an unlicensed band is idle, *based on a carrier sensing procedure*; and

*based on the cell being determined to be idle,* transmit, in the cell, a downlink transmission in one or more consecutive time periods[after the cell is determined to be idle], wherein a number of symbols, on which at least part of the downlink transmission is mapped, included in a last time period among the one or more consecutive time periods is less than 14, wherein information indicating the number of the symbols is transmitted through downlink control information, wherein the last time period is included in a full time period configured as 14 symbols, and wherein remaining symbols included in the [last] *full* time period *including the last time period,* except for the symbols *on which at least part of the downlink transmission is mapped,* are unoccupied by transmissions in the unlicensed band.

9. The base station of claim 8, wherein a $1^{st}$ time period among the one or more consecutive time periods starts from a predetermined symbol boundary within a full time period configured as 14 symbols, and wherein a size of the $1^{st}$ time period is equal to or less than [the full time period] *14 symbols*.

10. The base station of claim 9, wherein a starting time of the $1^{st}$ time period is aligned with a boundary of the full time period *related to the $1^{st}$ time period*, and wherein a symbol within a duration of the downlink transmission is aligned with a symbol of a cell configured in a licensed band.

11. The base station of claim 8, wherein the number of the symbols satisfies one of a plurality of downlink pilot time slot (DwPTS) configurations.

12. The base station of claim 11, wherein the DwPTS configurations are defined as in Table 1,

TABLE 1

| | Normal cyclic prefix in downlink | | |
|---|---|---|---|
| | | UpPTS | |
| Special subframe configuration | DwPTS | Normal cyclic prefix in uplink | Extended cyclic prefix in uplink |
| 0 | $6592 \cdot T_s$ | $2192 \cdot T_s$ | $2560 \cdot T_s$ |
| 1 | $19760 \cdot T_s$ | | |
| 2 | $21952 \cdot T_s$ | | |
| 3 | $24144 \cdot T_s$ | | |
| 4 | $26336 \cdot T_s$ | | |
| 5 | $6592 \cdot T_s$ | $4384 \cdot T_s$ | $5120 \cdot T_s$ |
| 6 | $19760 \cdot T_s$ | | |
| 7 | $21952 \cdot T_s$ | | |
| 8 | $24144 \cdot T_s$ | | |
| 9 | $13168 \cdot T_s$ | | |

wherein $T_s$ denotes a sampling time.

13. The method of claim 1, wherein the information indicating the number of the symbols is information only indicating the number of the symbols.

* * * * *